US006110316A

United States Patent [19]

Kobayashi et al.

[11] Patent Number: 6,110,316

[45] Date of Patent: Aug. 29, 2000

[54] METHOD AND APPARATUS FOR CURVED-SURFACE TRANSFER

[75] Inventors: Kazuhisa Kobayashi; Mitsutoyo Miyakoshi; Masaru Okamoto; Haruo Miyashita; Hirohisa Yoshikawa; Haruo Ono; Reiko Kan; Kazuo Kitamura; Tutomu Ichihashi, all of Shinjuku-Ku, Japan

[73] Assignee: Dai Nippon Printing Co., Ltd., Japan

[21] Appl. No.: 09/125,692

[22] PCT Filed: Dec. 8, 1997

[86] PCT No.: PCT/JP97/04490

§ 371 Date: Oct. 16, 1998

§ 102(e) Date: Oct. 16, 1998

[87] PCT Pub. No.: WO98/29265

PCT Pub. Date: Jul. 9, 1998

[30] Foreign Application Priority Data

| | | | |
|---|---|---|---|
| Dec. 27, 1996 | [JP] | Japan | 8-356672 |
| Feb. 28, 1997 | [JP] | Japan | 9-060126 |

[51] Int. Cl.[7] .............................. B44C 1/17; B32B 31/12; B32B 3/00; B41M 3/12

[52] U.S. Cl. .......................... 156/230; 156/238; 156/240; 156/247; 156/289; 156/540; 156/542; 427/147; 427/148; 428/195; 428/914

[58] Field of Search ................................ 156/61, 63, 230, 156/233, 238, 240, 241, 247, 277, 289, 499, 540, 542, 543; 427/146, 147, 148, 149; 428/141, 143, 195, 914; 118/300, 303, 313, 314, 315, 325, 326; 425/89

[56] References Cited

U.S. PATENT DOCUMENTS

| | | | |
|---|---|---|---|
| 3,497,410 | 2/1970 | Zagusta et al. | 156/233 |
| 5,498,609 | 3/1996 | Greten et al. | 156/347 |

FOREIGN PATENT DOCUMENTS

| | | |
|---|---|---|
| 51-106508 | 9/1976 | Japan . |
| 61-2513 | 1/1986 | Japan . |
| 62-144953 | 6/1987 | Japan . |
| 5-8697 | 1/1994 | Japan . |
| 7-67848 | 7/1995 | Japan . |
| 8-216599 | 8/1996 | Japan . |
| 8-244399 | 9/1996 | Japan . |
| 9-315095 | 12/1997 | Japan . |

*Primary Examiner*—Richard Crispino
*Assistant Examiner*—J. A. Lorengo
*Attorney, Agent, or Firm*—Parkhurst & Wendel, L.L.P.

[57] ABSTRACT

In order to produce a decorative laminate by adhering a transfer printing sheet to the three-dimensional irregular surface of a base, solid particles (P) are caused to collide with the transfer printing sheet (S) from the back surface thereof with the transfer printing sheet (S) facing the irregular surface of the base (B), and the transfer printing sheet (S) is brought into pressure contact with the irregular surface of the base (B) by utilizing the collisional pressure, thereby transferring the transfer printing sheet (S) to the base (B). In the case where a thermally stretchable transfer printing sheet is used, it is better to conduct transfer printing by heating at least one of the base, the transfer printing sheet, the solid particles, and so on.

23 Claims, 6 Drawing Sheets

METHOD AND APPARATUS FOR CURVED-SURFACE TRANSFER

TECHNICAL FIELD

The present invention relates to a method and a system for conducting transfer printing on curved surfaces, useful for producing facing materials and interior finishing materials for housing, and decorative laminates for furniture, appliances and the like, especially those decorative laminates which have patterns on their irregular surfaces.

BACKGROUND ART

Decorative laminates whose base surfaces are decorated with patterns or the like by a direct printing, laminating or transfer printing method, or the like, have conventionally been used for various uses. In such decorative laminates, the surfaces of the bases can easily be decorated with patterns when they are flat; however, patterns have been formed by special means when the surfaces have irregularities.

For instance, one of curved-surface-decorating techniques which can be applied to a case where base surfaces to be decorated are columnar and have two-dimensional irregularities [a shape having curvature in only one direction (in the direction perpendicular to the direction of generatrix or of height) like that of a column] such as Japanese Patent Publication No. 61-5895. Namely, the technique described in the above patent publication is a surface-decorating technique utilizing a laminating method which comprises feeding a decorative sheet whose one surface has been coated with an adhesive; horizontally carrying a base at a speed which is synchronized with the speed at which the decorative sheet is feed; pressing stepwise every small area of the decorative sheet against the base with the adhesive-coated surface of the decorative sheet facing the base, while maintaining by a large number of presser jigs juxtaposed in such a condition that the end of the decorative sheet is not adhered; and thermally adhering the decorative sheet to the surface of the base. This method is called a lapping method.

A curved-surface-decorating techniques applicable to a case where surface irregularities are three dimensional like those on embossed surfaces (i.e., a shape having curvature in two directions like that of a hemispheric surface) is proposed, for example, in Japanese Patent Laid-Open Publication No. 5-139097. Namely, the technique described in this patent publication is a surface-decorating method employing a transfer printing method in which a thermoplastic resin film is used as the substrate of a transfer printing sheet and which comprises placing, on a base having a convexly curved surface, a transfer printing sheet prepared by successively forming a release layer, a pattern layer and an adhesive layer on the substrate, and pressure the transfer printing sheet by a heated roll made of rubber having a rubber hardness of 60° or less from the back surface of the substrate to transfer the pattern to the base, thereby obtaining a decorative laminate. Further, an expandable layer which expands by heat applied thereto when transfer printing is conducted is provided between the substrate and the release layer. In this method, the expansion of this layer is also utilized to closely fit the transfer printing sheet to the irregular surface of the base.

However, among the above-described conventional methods, the method disclosed in Japanese Patent Publication No. 61-5895 can cope with, at most, two-dimensional curved surfaces; and the method proposed in Japanese Patent Laid-Open Publication No. 5-139097 can cope with three-dimensional curved surfaces, and is applicable to embossed configurations with small depths, but not applicable to large surface irregularities because the elastic deformation of the rubber of the rotating heated roll is basically utilized to closely fit the transfer printing sheet to surface irregularities. In addition, the roll made of soft rubber tends to be abraded by the corners of irregularities present on the transfer-printing-pattern-receiving base. Moreover, in the case of the configuration in which an expandable layer is provided on a transfer printing sheet, such a transfer printing sheet becomes complicated and excessively expensive. Further, transfer printing can be conducted only on flat-plate-like bases. Furthermore, in the above-described conventional techniques, a heated roll is used, and, when the heated roll is detached from the base, pressure is instantly removed; however, heat cannot be removed immediately due to heat capacity and thermal conductivity. Therefore, the transfer printing sheet is inevitably released from the pressure of the heated roll before the heat-sensitive adhesive is fully cooled, so that the transfer printing sheet separates from the base, and recessed portions cause defective transfer printing.

An object of the present invention is to provide a transfer printing method for curved surfaces and a transfer printing system for curved surfaces, capable of providing a transfer printing sheet on any three-dimensional curved surface.

DISCLOSURE OF THE INVENTION

According to the present invention, there is provided a transfer printing method for curved surfaces, useful for transferring a transfer printing sheet to the irregular surface of a transfer-printing-pattern-receiving base, the method comprising preparing a transfer printing sheet comprising a substrate sheet and a transfer printing layer formed on the surface of the substrate sheet, causing the transfer printing layer side of this transfer printing sheet to face the irregular surface of the base, causing solid particles to collide with the substrate sheet of the transfer printing sheet, and bringing the transfer printing sheet into pressure contact with the irregular surface of the base by utilizing the pressure developed by this collision, thereby transferring the transfer printing sheet to the base.

Further, according to the present invention, there is provided a transfer printing system for curved surface, useful for transferring a transfer printing sheet to the irregular surface of a transfer-printing-pattern-receiving base, the system comprising a pressure-applying device having a means for injecting solid particles, a base-carrying device by which the base is carried to a position in front of the pressure-applying device with the irregular surface of the base facing the pressure-applying device, and a transfer printing sheet feeder by which a transfer printing sheet is fed between the pressure-applying device and the irregular surface of the base which has been carried to the position in front of the pressure-applying device.

BEST MODE FOR CARRYING OUT THE INVENTION

Figure 1A:
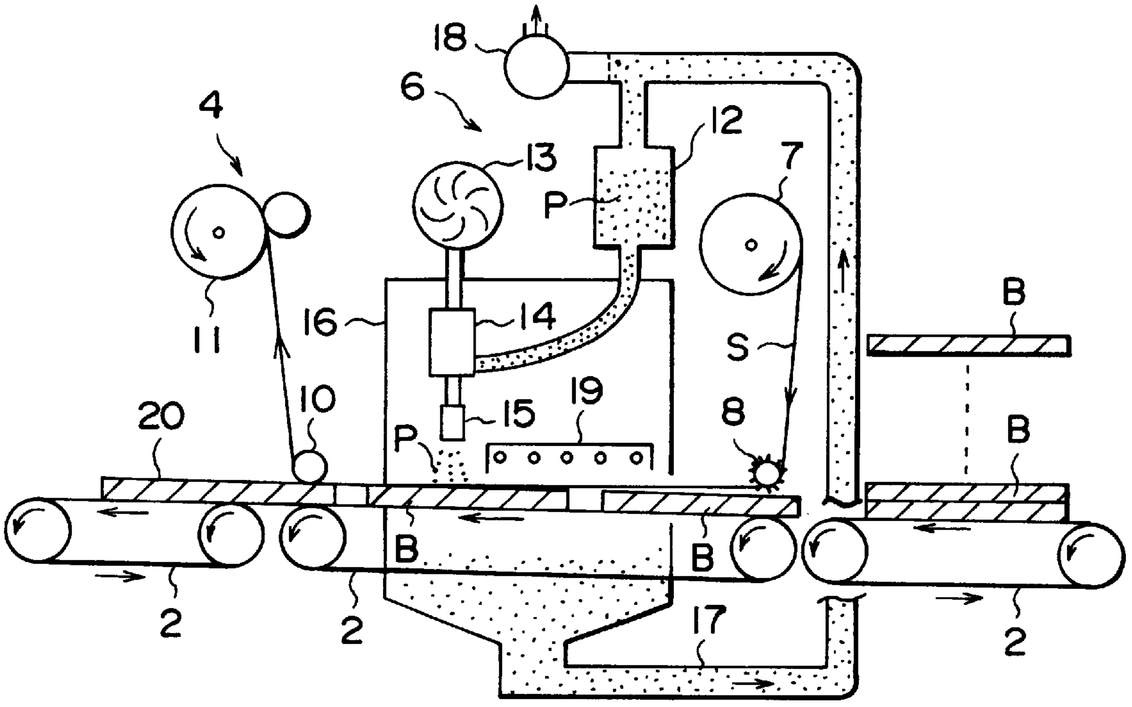
FIG. 1A is a schematic front view, partly in section, of a first embodiment of the transfer printing system for curved surfaces according to the present invention.
Figure 1B:
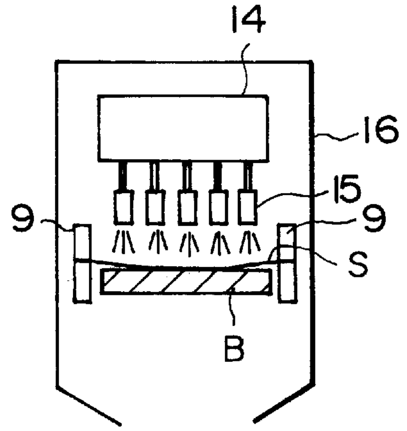
FIG. 1B is a vertical sectional side view of the pressure-applying device shown in FIG. 1A.

Embodiments of the transfer printing method and system for curved surfaces according to the present invention will be described hereafter. FIGS. 1A and 1B show a first embodiment of the transfer printing system for curved surfaces, which is used for effecting the transfer printing method for curved surfaces according to the present invention.

The transfer printing system for curved surfaces shown in FIG. 1A is a system for successively transfer-printing a pattern or the like, by the use of a continuous transfer printing sheet, on a base which has an irregular surface and whose enveloping surface is like a flat plate. The system shown in this figure composed of a base-carrying device 2 for a base B, a sheet-feeding device 4 for a transfer printing sheet S, and a pressure-applying device 6 for applying collisional pressure by causing solid particles P to collide with the back surface of the transfer printing sheets. The transfer printing sheet S comprises a substrate sheet, and a transfer printing layer formed on the surface of the substrate sheet.

The base-carrying device 2 is composed of a caterpillar-type conveyor belt, a row of driving rotating carrier rollers, and the like. The base B horizontally placed on the base-carrying device 2 is successively carried to the left in FIG. 1; the surface of the base is successively exposed to the collisional pressure of solid particles by the pressure-applying device 6; and the base is finally ejected.

The sheet-feeding device 4 is composed of a sheet feeder 7, a guide roller 8, sheet holders 9 as shown in FIG. 1B, a release roller 10, a sheet-ejecting device 11, and the like. The sheet-feeding device 4 conveys the transfer printing sheet S from a feed roll set in the sheet feeder 7 to the pressure-applying device 6 via the guide roller 8, and, in the pressure-applying device 6, conveys the transfer printing sheet S at the same speed as the speed at which the base B is carried, while maintaining a slight space between the transfer printing sheet S and the base B so that the transfer printing sheet can float above the base under such a condition that collisional pressure is not applied. The transfer printing sheet S is fed with the transfer printing layer on one surface thereof facing the base B side. The space between the transfer printing sheet S and the base B is maintained by the sheet holders 9 comprising a belt or the like which rotates as the transfer printing sheet S is carried, while supporting the transfer printing sheet 3 by sandwiching it at both ends thereof. Further, the sheet holder 9 prevents the solid particles P or an air stream for carrying the solid particles P from coming between the transfer printing sheet S and the base B. The substrate sheet of the transfer printing sheet S which has been closely adhered to the base B by the pressure-applying device 6 is separated from the base B by the release roller 10, and taken up by the sheet-ejecting device 11. The transfer printing layer of the transfer printing sheet thus remains on the base 1.

By the pressure-applying device 6, the solid particles S are caused to collide with the back surface (the substrate sheet side) of the transfer printing sheet S, and also recovered for reuse. The pressure-applying device 6 is composed of a hopper 12, a fan 13 such as a blower (or a compressor), a manifold 14, a plurality of nozzles 15, a chamber 16, a particle discharge pipe 17, a vacuum pump 18, and so on. Those solid particles P which are stored in the hopper are mixed in the manifold 14 with air which is sent from the fan 13 by pressure, and distributed to a plurality of the nozzles 15. The solid particles P are ejected from the nozzles 15 along with a jetting air stream. After being ejected from the nozzles 15 and colliding with the transfer printing sheet S, the solid particles P gather at the bottom of the chamber 16; they are then sucked up by the vacuum pump 18, and transferred to the original hopper 12 through the discharge pipe 17. The solid particles thus collected are stored in the hopper 12 for reuse. The chamber 16 covers the surroundings of the base B and the transfer printing sheet S which are subjected to transfer printing, the nozzles 15, and so on, except the inlet and outlet ports for the transfer printing sheet S and the base B, so that the solid particles P injected from the nozzles 15 will not scatter to the outside. Further, the pressure-applying device 6 shown in this figure is also provided with a heater 19 for preheating the transfer printing sheet S and the base B before exposing them to the collision of the solid particles P.

Next, one embodiment of the transfer printing method for curved surfaces according to the present invention will be described below by referring to the above-described system shown in FIGS. 1A and 1B.

First of all, a plate-like base B having an irregular transfer-printing-pattern-receiving surface is carried one by one into the chamber 16 of the pressure-applying device 6 by the base-carrying device 2. On the other hand, a sheet prepared by forming a transfer printing layer composed of a decorative layer and a heat-sensitive adhesive layer on a substrate sheet made from a thermoplastic resin is used as the transfer printing sheet S. While applying tension by the sheet-feeding device 4, the transfer printing sheet S is unwound by the feed roll set in the sheet feeder 7, and fed into the chamber 16 of the pressure-applying device 6 via the guide roller 8. In the chamber 16, while being supported by the sheet holders 9 at both ends in terms of width direction, the transfer printing sheet S is carried in parallel with the base B at the same speed as the speed at which the base B is fed, with the adhesive layer surface of the transfer printing sheet facing the base B, while maintaining a slight space between the base B and the transfer printing sheet S by the sheet holders 9. In the system shown in FIG. 1A, by preheating the transfer printing sheet S prior to the application of collisional pressure by the use of the heater 19 placed in the chamber 16 of the pressure-applying device 6, the stretchability of the sheet and the heat-sensitive adhesive layer of the sheet are activated. At the same time, the transfer-printing-pattern-receiving surface of the base B lying under the transfer printing sheet S is also heated, so that adhesion is readily attained by the adhesive layer. By these, the thermal adhesion of the transfer printing sheet to the base through the adhesion layer is smoothly attained.

Next, the transfer printing sheet S is subjected to the collision of the solid particles P which are injected from the nozzles 15 together with an air stream. A larger number of the nozzles 15 are linearly arranged in the direction intersecting the direction in which the transfer printing sheet S and the base B are fed (in the width direction), and in the direction vertical to the back surface of the transfer printing sheet. Therefore, the solid particles P injected from the nozzles 15 apply collisional pressure to a linear belt-like region on the transfer printing sheet S which covers almost the entire width of the transfer printing sheet S. The solid particles P injected from the nozzles 15 proceed in the direction of the transfer printing sheet S while spreading slightly. As a result, the solid particles can also collide with those areas which are present between the nozzles 15 provided in a large number. The transfer printing sheet S, which is fed while maintaining a space between the transfer printing sheet S and the base B so that the transfer printing sheet can float on the base B, is brought into pressure contact with the base B by the collisional pressure of the solid particles, and deformed by being extended into recessed portions on the irregular surface of the base B. The transfer printing sheet is thus closely fitted to the shape of the irregular surface of the base B.

The base B used in the above description is a plate-like material whose enveloping surface is a plane as a whole, although it has an irregular surface. Moreover, both ends in terms of width direction of the transfer printing sheet S are covered with the sheet holders 9, and the transfer printing sheet S is carried under such a condition that the transfer printing sheet is separated from the surface of the base 1 as long as collisional pressure or the like is not applied to the base B. Therefore, it is so made that the adhesion of the transfer printing sheet S to the base B at the central part in terms of width direction is attained earlier than the adhesion of these two at the area in the vicinity of their both ends in terms of width direction. For this reason, as a whole, the transfer printing sheet S and the base B are fed at the same speed, and successively exposed to the collisional pressure in the flow direction. This is a means for closely adhering the transfer printing sheet S to the irregular surface of the base B without leaving air between them.

On the other hand, the solid particles P after used for the collision with the transfer printing sheet S are conveyed, via the sides of the sheet holders 9, to the bottom of the chamber 16 to which the discharge pipe 17 is connected. They are then sucked up from the bottom of the chamber 16, and collected in the original hopper 12 through the discharge pipe 17. Further, the air ejected from the nozzles 15, used for the injection of the solid particles is also sucked up by the vacuum pump 18, and exhausted to the outside of the system through the discharge pipe 17. Thus, the chamber 16 is so made that the solid particles will not flow out to the surroundings along with the air from the inlet and outlet ports for the transfer printing sheet and the base. It is suitable to make the internal pressure of the chamber 16 lower than the outside pressure in order to prevent the solid particles P from flowing out from the chamber 16.

The transfer printing sheet S closely adhered to the base B is ejected as it is to the outside of the chamber 16, and the substrate sheet of the transfer printing sheet S is separated from the base B by the release roller 10. As a result, there is obtained a decorative laminate 20 in which the decorative layer of the transfer printing sheet S is transferred to the irregular surface of the base B through the adhesive layer of the transfer printing sheet. On the other hand, the substrate sheet of the transfer printing sheet S after passing the release roller 10 is carried obliquely upward, and taken up by the sheet-ejecting device 11 as an ejecting roll. The base 1 after passing the release roller 10 is horizontally carried to the left side in FIG. 1A by the base-carrying device 2.

One embodiment of the transfer printing method for curved surfaces according to the present invention is as described before. The method according to the present invention will be described in further detail.

As the base B for use herein, a material whose transfer-printing-pattern-receiving surface is smooth can, of course, be used. However, the present invention fully shows its advantageous effects when a base has an irregular transfer-printing-pattern-receiving surface, especially when the irregularities are three-dimensional ones. The conventional rotary presser jigs (previously-mentioned Japanese Patent Publication No. 61-5895) and rotary rubber-made roller (previously-mentioned Japanese Patent Laid-Open Publication No. 5-139097) intrinsically have directional property due to their rotating shafts, so that surface irregularities to which these rollers can be applied are limited only to two-dimensional ones having curvature in only one axis direction. Further, although the latter roller can be applied to three-dimensional irregularities having curvature in two axis directions, it is impossible to uniformly apply the roller to all directions of three-dimensional irregularities. For instance, a pattern of wooden grain vessels cannot be well transfer-printed to recessed portions which correspond to the vessels unless the longer direction of the pattern is made parallel to the direction in which the transfer printing sheet is carried. Moreover, the use of the latter roller is practically limited only to flat-plate-like bases. When bases are not flat plates, transfer printing cannot be attained unless the roller is made into a rotary roller having a special shape depending upon the shape of each base.

However, as mentioned hereinbefore, the collisional pressure of solid particles which can act as a fluid is utilized in the present invention, so that there is intrinsically no directional property in terms of the application of pressure to three-dimensional surface irregularities (the directional property as used herein means the direction in which the point on the base to which pressure is applied changes with time). Therefore, even a base which has irregularities in the direction in which the transfer printing sheet and the base are carried can be used in the method of the present invention. Namely, this means that transfer printing can be conducted on a surface having two-dimensional irregularities, that is, a surface having irregularities only in the feeding direction or in the width direction, and also on a surface having three-dimensional irregularities, that is, a surface having irregularities both in the feeding direction and in the width direction. It can easily be understood that the present invention does not have the above-described directional property, if a method and a system in which a transfer printing sheet in sheet form is placed on a base, and brought into pressure contact with the base one by one (such an embodiment is also included in the present invention) is taken into consideration.

The base which can be used in the present invention is not only a material which is a flat plate as a whole, but also a base having two-dimensional irregularities in which each convexity or concavity is curved into the shape of an arc either in the feeding direction or in the width direction, and a base further having more minutes three-dimensional irregularities on the above-mentioned curved surfaces. In the present invention, the direction in which transfer printing is conducted on a base having two-dimensional irregularities in the shape of an arc or the like can be freely selected in consideration of working properties, etc.

It is also possible to use a base having an irregular surface on which fine irregularities are overlapped on great irregularities, or a base having an irregular surface whose recessed portions have bottom surfaces or sidewall surfaces to which a pattern should be transfer-printed. The above-described large irregularities and fine irregularities are such that the fine irregularities 70*b* are present on the raised surfaces 70*a* of the large irregularities as shown, for example, in FIG. 5B. With respect to the large irregularities, the difference in level is from 1 to 10 mm, the width of the recessed portion 70*c* is from 1 to 10 mm, and the width of the raised portion 70*a* is greater than 5 mm. With respect to the fine irregularities, both the difference in level and the width are smaller than those in the larger irregularities; specifically, the difference in level is approximately 0.1 to 5 mm; the width of the recessed portion and that of the raised portion are 0.1 mm or greater, and approximately less than ½ of the width of the raised portion of the great irregularities.

Faces constituting the irregular surface are composed of either planar faces or curved faces, or of any combination of planar and curved faces. Therefore, the curved surface of the transfer-printing-pattern-receiving base of the present invention also includes an irregular surface having no curved faces, composed of a plurality of planar faces with a step-wise cross-section. Further, the curvature as used herein also includes infinite curvature (radius of curvature=0) in the case of angular shapes, like in the vicinity of sides or apexes of a cube.

Any material can be used as the base B. For example, the following plate materials can be used: non-ceramic plates such as calcium silicate plates, cement extruded plates, ALC (light-weight foamed concrete) plates and GRC (glass-fiber-reinforced concrete plates); wooden boards such as veneers, ply woods, particles boards and wooden medium density fiber boards (MDF); metal plates such as iron, aluminum and copper plates; ceramics such as porcelains and glasses; and resin moldings made from polypropylene, ABS resin, phenol resin and the like. On the surfaces of these bases, an adhesion-promoting primer for assisting adhesion with an adhesive, or a sealer for filling and sealing fine irregularities or pores present on the surfaces may be coated in advance. As the adhesion-promoting primer, or as the sealer for filling and sealing fine irregularities or pores present on the surfaces, a resin such as isocyanate, two-pack curable urethane resin, acrylic resin or vinyl acetate resin is coated.

Desired irregularities may be provided on the surface of the base by means of pressing, embossing, extrusion, cutting, molding or the like. Further, the irregularities can be of any shape including joints of tiles, bricks, etc., irregularities on stone surface such as the cleaved faces of granite, irregularities on the surfaces of wooden boards such as wooden lining boards and raised woodgrains, and irregularities on spray-coated surfaces like scratching finish of stucco, or stucco finish.

Next, with respect to the transfer printing sheet S for use in the present invention, when the base B has a two-dimensional irregular surface, it is possible to use a transfer printing sheet having a substrate sheet which has no stretchability, such as paper. However, in order to apply to three-dimensional irregularities for which the present invention fully reveals its advantageous effects, a transfer printing sheet which shows stretchability at least at the time when transfer printing is conducted is used. Owing to the stretchability, when the collisional pressure of the solid particles is applied, the transfer printing sheet can closely be fitted even to the inside of recessed portions on the surface of the base and closely adhered thereto, and transfer printing can thus be successfully attained.

As mentioned previously, the transfer printing sheet comprises a substrate sheet, and a transfer printing layer which will be transferred to the base. The transfer printing layer comprises at least a decorative layer; and, if an adhesive layer is further laminated thereto, it is possible to omit the application of an adhesive to one of or both of the transfer printing sheet and the base when transfer printing is conducted. The stretchability of the transfer printing sheet is governed by that of the substrate sheet. Therefore, if a rubber film is used as the transfer printing sheet, owing to the property of rubber of being stretchable even at normal temperatures, the transfer printing sheet can closely be fitted to and adhered to the irregular surface of the base, and be successfully transferred to the base without heating the transfer printing sheet and the like when transfer printing is conducted. Further, when a thermoplastic resin film is used as the substrate, the transfer printing sheet for use in the present invention can easily be prepared as a transfer printing sheet which shows almost no stretchability when the decorative layer is formed but which reveals sufficient stretchability when heated at the time of transfer printing. As the substrate sheet, it is possible to use even a biaxially-oriented polyethylene terephthalate film that has conventionally been used often depending upon the shape of surface irregularities, and transfer printing can be attained on curved surfaces. This is because such a film can reveal required stretchability if the conditions of heating and of collisional pressure are properly controlled. Preferable material for the substrate sheet are those ones which can more readily reveal stretchability at low temperatures under low pressures, for example, films of copolymeric polyesters such as polybutylene terephthalate and terephthalate isophthaethylenelate copolymers; polyolefin films such as polyethylene films, polypropylene films and polymethylpentene films; low- or non-stretchable films such as vinyl chloride resin films and nylon films; and films of rubber (elastomers) such as natural rubber, synthetic rubber, urethane elastomers and olefin elastomers.

Further, a release layer may also be formed on the substrate sheet on its transfer printing layer side, if necessary, in order to improve the release properties of the transfer printing layer. This release layer is separated and removed from the transfer printing layer along with the substrate when the substrate is separated. To form the release layer, silicone resins, melamine resins, polyamide resins, urethane resins, polyolefin resins, waxes, etc. are used either singly or as a mixture of two or more members.

The decorative layer is a pattern layer on which a pattern or the like has been printed by the use of a conventional material by means of a conventionally-known means such as gravure printing, silk screen printing or off-set printing; a metallic thin film layer on which a metal such as aluminum, chromium, gold or silver is partially or entirely placed by a conventional method of deposition or the like; or the like, and a layer suitable for the use is employed. As the pattern, a wooden grain, marble grain, tile-like, brick-like or solid pattern, or the like is used. An ink for forming the pattern layer comprises a vehicle consisting of a binder and the like, a coloring agent such as a pigment or dye, and various additives which are properly added to the binder and the coloring agent. The binder is one of acrylic resins, vinyl chloride-vinyl acetate copolymers, polyester resins, cellulosic resins, polyurethane resins, fluororesins and the like, or a mixture containing any of these resins and copolymers. As the pigment serving as the coloring agent, an inorganic pigment such as titanium white, carbon black, red oxide, chrome yellow or ultramarine blue, or an organic pigment such as aniline black, quinacridone, isoindolinone or phthalocyanine blue is used. Further, it is the same as in conventionally-known transfer printing sheets that a release layer or the like may be provided between the substrate sheet and the decorative layer in order to control the releasability between these layers. Furthermore, the adhesive layer is also a conventionally-known one which can be formed by using a heat-sensitive thermoplastic resin or the like such as a polyvinyl acetate, acrylic, polyamide, or blocked isocyanate curable polyurethane resin. The adhesive layer of the transfer printing sheet can be omitted when the decorative layer itself has adhesiveness, or when an adhesive layer is provided on the transfer-printing-pattern-receiving base.

Although the adhesive layer can be provided on the transfer printing sheet, it is also possible to adopt any of various manners such as a manner in which the adhesive layer is not provided on the transfer printing sheet in advance, but provided on it by means of coating or the like just before conducting transfer printing; a manner in which the adhesive layer is provided on the base by means of coating either in advance or just before conducting transfer printing; or a manner in which the adhesive layer is provided on both the transfer printing sheet and the base either in advance or just before conducting transfer printing. The manner in which the adhesive layer is provided only on the transfer printing sheet in advance is advantageous in that it can be formed by means of printing or the like concurrently with the formation of the decorative layer and that the step of and an device for providing the adhesive layer when transfer printing is conducted can be omitted. Further, in the case where the adhesive layer is provided on either one of or both of the transfer printing sheet and the base just before conducting transfer printing, even such an adhesive as a pressure-sensitive adhesive or an aqueous adhesive can be used. Furthermore, a porous base is convenient for drying a solvent contained in an adhesive which is coated right before conducting transfer printing. In this case, it is also possible to use a guide roller having a large number of needles as the guide roller 8 of the transfer-printing-sheet-feeding device 4 to perforate the transfer printing sheet when it passes on the roller, thereby promoting the drying of the solvent by the aid of these holes perforated. The diameters of the holes are generally about 0.1 to 1.0 mm, and the distance between two adjacent vent holes is generally about 5 to 50 mm.

As the adhesive, a heat-sensitive, pressure-sensitive or ionization-radiation-curable adhesive, or the like can be used. As the heat-sensitive adhesive, either a thermally-fusible adhesive prepared by using a thermoplastic resin, or a thermally-curable adhesive prepared by using a thermosetting resin may be employed. However, a thermally-fusible adhesive is preferred because adhesion is completed in a short time when such an adhesion is used.

As the thermally-fusible adhesive, it is possible to use not only conventionally-known hot-melt adhesives such as polyvinyl acetate, acrylic resins, thermoplastic polyester resins, thermoplastic urethane resins, and polyamide resins obtainable by condensation polymerization between dimer acids and hexamethylenediamine, but also moisture-hardening-type hot-melt adhesives and the like. Moisture-hardening-type hot-melt adhesives are applied just before conducting transfer printing by taking stability during operation is taken into consideration. This is because the hardening reaction of such adhesives progresses due to moisture present in the air when they are allowed to stand in surrounding conditions.

The thermally-curable adhesives are those adhesives whose adhesion is activated as hardening reaction progresses by the application of heat. When the hardening reaction is once allowed to progress to some extent by the application of heat, adhesive power can be obtained, so that the substrate can be separated and removed even after the adhesive is cooled. Thermosetting resins which are solid or liquid at normal temperatures can be used as these thermally-curable adhesives. Specific examples of such resins include phenol resins, urea resins, diallylphthalate resins, thermosetting urethane resins and epoxy reins. Thermally-curable adhesives are a little bit disadvantageous in that they are late to reveal their adhesive power, but advantageous in that they can show excellent adhesive power when used practically.

Moisture-hardening-type hot-melt adhesives show similar change in adhesive power to that shown by ordinary hot-melt adhesives when pressure contact or separation is conducted. However, these adhesives are cured with the gradual progress of crosslinking reaction after separation, so that they are free from creep deformation and heat fusion. They are thus excellent in thermal resistance, and can show great adhesive power. Moreover, they show sufficiently high initial adhesive power like hot-melt adhesives, so that they have such advantageous properties that voids are not produced in the transfer-printed pattern and that high productivity can be attained. However, after transfer printing is completed, the crosslinking/curing of the adhesives is allowed to progress by moisture, so that the decorative laminate after transfer printing is completed is allowed to stand in the air containing moisture for aging.

Moisture-hardening-type hot-melt adhesives are a kind of hot-melt adhesives. Since the hardening reaction of moisture-hardening-type hot-melt adhesives progresses due to moisture contained in the air when they are allowed to stand in surrounding conditions. Therefore, they are applied just before conducting transfer printing by taking stability during operation into consideration. Further, moisture-hardening-type hot-melt adhesives show the similar adhesive power to that shown by ordinary hot-melt adhesives after transfer printing is completed. However, the crosslinking/hardening reaction of these adhesives gradually progresses due to moisture contained in the air when they are allowed to stand in surrounding conditions. Therefore, they finally show neither creep deformation nor heat fusion; they are thus excellent in thermal resistance, and show great adhesive power. However, the crosslinking/hardening of the adhesives is allowed to progress by moisture after transfer printing is completed, so that the decorative laminate after transfer printing is completed is allowed to stand in the air containing moisture for aging. Preferred atmospheric conditions for aging are roughly such that the relative humidity is 50%RH or higher and that the temperature is not lower than 10° C. When both temperature and relative humidity are higher, the hardening of the adhesives is completed in a shorter time. The time normally taken for completing the hardening is generally about 10 hours in an atmosphere of 20° C. and 60%RH.

Moisture-hardening-type hot-melt adhesives are compositions containing as an essential component a prepolymer having isocyanate group at the end of one molecule thereof. The above-described prepolymer is polyisocyanate prepolymer generally having one or more isocyanate groups at each end of one molecule thereof, and in the form of a thermoplastic resin which is solid at room temperature. The isocyanate groups react with each other in the presence of moisture contained in the air to cause a chain-extending reaction. As a result, a reaction product containing urea bond in its molecular chain is formed, and isocyanate group at the end of the molecule further reacts with this urea bond to form biuret bond for branching. Crosslinking reaction is thus caused.

The prepolymer having isocyanate groups at the ends of one molecule thereof can have any molecular chain structure. Specific examples of the molecular chain structure include polyurethane structure having urethane bond, polyester structure having ester linkage, and polybutadiene structure. The physical properties of the adhesive can be controlled by properly selecting one or more of these structures. In the case where urethane bond is present in the molecular chain, the isocyanate end group reacts also with this urethane bond to form allophanate bond, and crosslinking reaction is brought about also by this allophanate bond.

Specific examples of polyisocyanate prepolymers include urethane prepolymers which are obtained, for example, by reacting polyols with excessive polyisocyanate and which have such polyurethane structure that isocyanate groups are present at the ends of one molecule and that urethane bond is contained in their molecular chains; crystalline urethane prepolymers as disclosed in Japanese Patent Laid-Open Publication No. 64-14287, which are obtained by adding, in any order, polyester polyols and polyols having polybutadiene structure to polyisocyanate, and carrying out addition reaction, which have such a structure that polyester structure and polybutadiene structure are combined with each other through urethane bond and which have isocyanate groups at the ends of one molecule; polycarbonate urethane prepolymers as disclosed in Japanese Patent Laid-Open Publication No. 2-305882, which are obtained by reacting polycarbonate polyols with polyisocyanates and which have two or more isocyanate groups in one molecule; and polyester urethane prepolymers which are obtained by reacting polyester polyols with polyisocyanates and which have two or more isocyanate groups in one molecule.

Further, in addition to the above-described various polyisocyanate prepolymers, a variety of submaterials such as thermoplastic resins, tackifiers, plasticizers and fillers can also be added to the moisture-hardening-type hot-melt adhesives in order to control various physical properties thereof. Examples of submaterials include thermoplastic resins such as ethylene-vinyl acetate copolymers, low-molecular-weight polyethylene, modified polyolefins, atactic polypropylene, linear polyesters and ethylene-ethyl acrylate (EAA); tackifiers such as terpene-phenol resins and rosin abietate; fillers (extender pigments) such as fine powders of calcium carbonate; barium sulfate, silica and alumina; coloring pigments; catalytic hardeners; moisture-removing agents; storage stabilizers; and antioxidants.

Ionizing-radiation-curable resins which can be used as ionizing-radiation-curable adhesives are those compositions which can be cured by the irradiation of ionizing radiation, specifically those ionizing-radiation-curable compositions which are obtained by properly mixing prepolymers (including so-called oligomers) and/or monomers having radically-polymerizable unsaturated bond or cationically-polymerizable functional groups in one molecule thereof. These prepolymers or monomers are used either singly or in combination of two or more members. It is noted that ultraviolet rays (UV) or electron beams (EB) are used as the ionizing radiation.

The above-described prepolymers or monomers specifically include compounds having in one molecule thereof radically-polymerizable unsaturated groups such as (meth) acryloyl group and (meth)acryloyloxy group, or cationically-polymerizable functional groups such as epoxy group. Further, polyene/thiol prepolymers comprising polyenes and polythiols in combination may also be preferably used. It is noted that, for example, (meth)acryloyl group refers to acryloyl or methacryloyl group.

Examples of prepolymers having radically-polymerizable unsaturated groups include polyesters, (meth)acrylate, urethane (meth)acrylate, epoxy (meth)acrylate, melamine (meth)acrylate and triazine (meth)acrylate; and those having molecular weights of approximately 250 to 100,000 are generally used.

Examples of monomers having radically-polymerizable unsaturated groups include, as monofunctional monomers, methyl (meth)acrylate, 2-ethylhexyl (meth)acrylate and phenoxyethyl (meth)acrylate; and, as polyfunctional monomers, diethylene glycol di(meth)acrylate, propylene glycol di(meth)acrylate, trimethylolpropane tri(meth)acrylate, trimethylolpropane ethyleneoxide tri(meth)acrylate, dipentaerythritol penta(meth)acrylate and dipentaerythritol hexa (meth)acrylate.

Examples of prepolymers having cationically-polymerizable functional groups include prepolymers of epoxy resins such as bisphenol-type epoxy resins and novolak-type epoxy compounds, and prepolymers of vinyl ether resins such as aliphatic vinyl ethers and aromatic vinyl ethers.

Examples of thiols include polythiols such as trimethylolpropane trithioglycoate and pentaerythritol tetrathioglycolate. Examples of polyenes include one obtained by adding allylalcohol to both ends of polyurethane obtained from a diol and diisocyanate.

In order to cure the above-described ionizing-radiation-curable resins by the irradiation of ultraviolet or visible light, a photopolymerization initiator is further added to them. For those resin systems containing radically-polymerizable unsaturated groups, acetophenone, benzophenone, thioxanthone, benzoin and benzoin methyl ether may be used as the photopolymerization initiator either singly or in combination. For those resin systems containing cationically-polymerizable functional groups, aromatic diazonium salts, aromatic sulfonium salts, aromatic iodonium salts, methallocene compounds and benzoin sulfonic esters can be used as the photopolymerization initiator either singly or in combination. The amount of such a photopolymerization initiator to be added is approximately 0.1 to 10 parts by weight for 100 parts by weight of the ionizing-radiation-curable resin.

Magnetic wave or charged particles having light quantum capable of crosslinking the molecules in the adhesive are used as the ionizing radiation. Generally used are ultraviolet rays or electron beams; however, visible light, X-rays, ionized rays, or the like can also be used. As the source of ultraviolet rays, there is used a light source such as an ultra-high pressure mercury vapor lamp, a high-pressure mercury vapor lamp, a low-pressure mercury vapor lamp, a carbon-arc lamp, black light, or a metal halide lamp. In general, ultraviolet light having a wavelength of 190 to 380 nm is mainly used. As the source of electron beams, it is possible to use any of various electron beam accelerators of Cockcroft-Walton type, van de Graaff type, resonance transformer type, insulating-core transformer type, linear type, dynamitron type and high frequency type, capable of applying electrons with energy of 100 to 1000 keV, preferably 100 to 300 keV.

It is also possible to add, to the above-described ionizing-radiation-curable resins, thermoplastic resins such as vinyl chloride-vinyl acetate copolymers, polyvinyl acetate, acrylic resins and cellulosic resins, as needed. When no diluent solvent is added to these mixtures, they become hot-melt adhesives.

In the case where the ionizing-radiation-curable resin is used, it is possible to incorporate into the transfer printing system for curved surfaces an ionizing radiation irradiator for irradiating ultraviolet rays or electron beams. Irradiation may be conducted either during or after the application of collisional pressure, or both during and after the application of the same.

Further, a variety of additives may further be added to the above-described various resins, as needed. Examples of these additives include extender pigments (fillers) such as fine powders of calcium carbonate, barium sulfate, silica and alumina, and thixotropic-properties-imparting agents such as organic bentonite (useful for preventing an adhesive from flowing from raised portions into recessed portions, especially when the transfer-printing-pattern-receiving base has surface irregularities which are great in difference in level).

The objective of the application of the adhesive is the transfer printing sheet or the transfer-printing-pattern-receiving base, or both of them. To apply the adhesive to a sheet such as the transfer printing sheet or to the transfer-printing-pattern-receiving base, a solution or dispersion prepared by dissolving or dispersing the adhesive in a solvent is applied, or the adhesive itself is applied without using any solvent. The application can be conducted by means of solution coating using a conventionally-known gravure roll coater or the like, or of hot melt coating using an applicator or the like. When the adhesive is used without adding thereto any diluent solvent, solvent removal by means of drying is not required. For example, the hot-melt adhesives can be used as solvent-free hot-melt adhesives. Further, the ionizing-radiation-curable adhesives, etc. can also be applied without using any solvent. In the case where the adhesive is used as a hot-melt adhesive, no solvent is used, so that solvent removal by means of drying is not required even when the adhesive is applied just before conducting transfer printing. High-speed production can thus be attained. The amount of the adhesive to be applied depends upon the composition of the adhesive, or the type or surface conditions of the transfer-printing-pattern-receiving base; and it is generally about 10 to 200 g/m$^2$ (solid matter).

In the case where the adhesive is applied to the transfer-printing-pattern-receiving base at the time when transfer printing is conducted, a base coater 60 can be used. Also in the case where the adhesive is applied to the transfer printing sheet, the same coater as is used for coating the adhesive to the base can be used.

Further, in the case where the adhesive is used as a hot-melt adhesive, in order to transfer the transfer printing sheet so that it will be more closely fitted to the irregularities on the transfer-printing-pattern-receiving base, it is inevitably required to select, as the substrate of the transfer printing sheet, a material which shows thermoplasticity or rubber elasticity at room temperature or when heated, like a thermoplastic resin sheet such as a polypropylene resin sheet. Considering from another point of view, this fact means that it cannot help selecting a material having low thermal resistance as the substrate. Therefore, when the adhesive is applied by means of hot melt coating and the adhesive layer is made thick to obtain a transfer printing sheet, the substrate is softened by heat which is applied when hot melt coating is conducted. In addition, the sheet sticks to a heated applicator roller in the adhesive-applying device, and is dragged. As a result, the sheet may be stretched, distorted or entangled.

For this reason, in such a case, it is better to produce the transfer printing sheet not by applying the adhesive directly to the sheet by means of hot melt coating, but by applying the adhesive to the sheet through a release sheet (separator). Namely, the adhesive is applied to a release sheet having thermal resistance and release properties by means of hot melt coating; by utilizing this adhesive applied, the release sheet and a sheet which will be a transfer printing sheet are once thermally laminated by a nip roller or the like; subsequently, only the release sheet is separated from the sheet by a release roller or the like to obtain a transfer printing sheet having thereon the adhesive layer while less damaging the transfer printing sheet.

The release sheet is not required to have stretchability or the like; and it can be a conventionally-known release sheet obtained by coating silicone resin, polymethyl pentene or the like onto the surface of such a substrate as a biaxially-oriented polyethylene terephthalate sheet, a heat-resistance resin sheet made from polyethylene naphthalate, polyallylate or polyimide, or paper. The thickness of the release sheet is, in general, approximately 50 to 200 $\mu$m.

When a hot-melt adhesive is used as the adhesive, the timing of heating to activate the adhesive for thermal fusion is either before or during the application of collisional pressure, or both before and during the application of collisional pressure. The heating of the adhesive is conducted by heating the transfer printing sheet or the transfer-printing-pattern-receiving base. It is possible to heat either the material to which the adhesive has been applied (the transfer printing sheet or the transfer-printing-pattern-receiving base), or the material to which no adhesive has been applied, or both of these materials. Further, in order to conduct heating during the application of collisional pressure, heated solid particles may also be used.

Decorative laminates obtainable by the transfer printing method and system for curved surfaces according to the present invention described before can be used in various fields, for instance, facing materials such as exterior walls, fences, roofs, gate doors and gable boards, interior finish materials for housing such as walls and ceilings, fixtures such as window frames, doors, handrails, thresholds and lintels, facings of furniture such as cabinets, cabinets of light electrical appliances or OA appliances, and interior trims for vehicles such as automobiles.

It is also possible to coat a transparent protective layer on the surface of the decorative laminate after transfer printing is completed. Such a transparent protective layer is formed by the use of a coating prepared by using, as a binder, one or more resins selected from fluororesins such as polyethylene tetrafluoride and polyvinylidene fluoride, acrylic resins such as polymethyl methacrylate, silicone resins and urethane resins, to which ultraviolet light absorbers such as benzotriazole and ultrafine serium oxide particles, photostabilizers such as hindered amine radical scavenger, coloring pigments, extender pigments, lubricants are added, as need.

The coating is coated by means of spray coating, flow coating, or the like. The thickness of the transparent protective layer is approximately 1 to 100 μm.

Prior to conducting transfer printing, heating is conducted, when necessary, in order to activate the stretchability of the transfer printing sheet, to activate the adhesive layer, or to heat the adhesive surface of the base. Any heating means can be used for this purpose. As a means for heating which is conducted before the application of collisional pressure, like the heater 19 in the transfer printing system for curved surfaces shown in FIG. 1A, heater heating, infrared heating, dielectric heating, induction heating, hot air heating or the like can be used. Further, in the present invention, solid particles are used for applying pressure, so that it is also possible to use heated solid particles as the heat source for heating the transfer printing sheet and the like, thereby heating the transfer printing sheet concurrently with the adhesion of thereof. To heat solid particles means that a gas to be jetted from the nozzles together with the solid particles is also heated and jetted. Since this gas is brought into contact with the back surface of the transfer printing sheet, it can also be used as the heat source. Therefore, even when the transfer printing sheet or the like is required to be heated, if it is enough to heat the transfer printing sheet or the like by the solid particles and the jetting gas, a heater for preheating can be omitted.

As the solid particles P, it is possible to use inorganic particles which are inorganic powders such as glass beads, ceramic beads, calcium carbonate beads, alumina beads and zirconia beads; metallic particles such as beads of iron, iron alloys such as carbon steel and stainless steel, aluminum, aluminum alloys such as Duralumin, zinc, and titanium; and organic particles such as resin beads, for example, fluororesin beads, nylon beads, silicone resin beads, urethane resin beads, urea resin beads, phenolic resin beads and cross-linked rubber beads. The preferred shape of the solid particles is spherical, but any other shape is acceptable. The size of the solid particles is generally about 10 to 1000 μm.

By the use of heated solid particles as the solid particles, it is also possible to improve the stretchability of the transfer printing sheet by heating it, to activate the adhesion power of the hot-melt adhesive by heating it, or to promote the thermal cure of the thermally-curable adhesive by heating it concurrently with the pressing of the transfer printing sheet. In this case, the transfer printing sheet and the transfer-printing-pattern-receiving base may also be previously heated to some extent by another heating means before collisional pressure is applied to them. Further, in the case where the activation of such an adhesive as a hot-melt adhesive is conducted by heating, solid particles at a temperature lower than the temperature of the adhesive at the time of adhesion can also be used as cooled solid particles in order to promote cooling after adhesion is completed. It is also possible to use the solid particles as partly or entirely heated or cooled solid particles, or as heated or cooled solid particles. Furthermore, the shaping, adhesion and cooling of the transfer printing sheet can be conducted almost at the same time by the use of cooled solid particles, and by sufficiently heating in advance by the use of another heating means the transfer printing sheet, the transfer-printing-pattern-receiving base, the adhesive, etc. which require heating. The cooling or heating of the solid particles is conducted while the solid particles are stored in the hopper for storing solid particles. In the hopper, the solid particles are heated by dielectric heat (when the solid particles are dielectric), or induction heat (when the solid particles are conductive or magnetic).

Figure 2A:
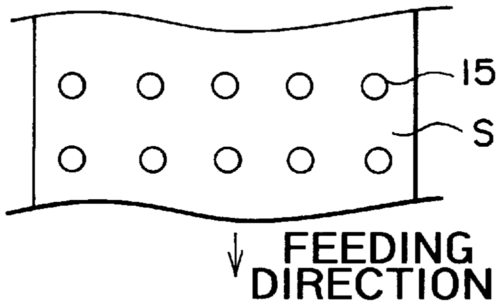
FIGS. 2A and 2B are plan views showing different arrangements of injection nozzles.
Figure 2B:
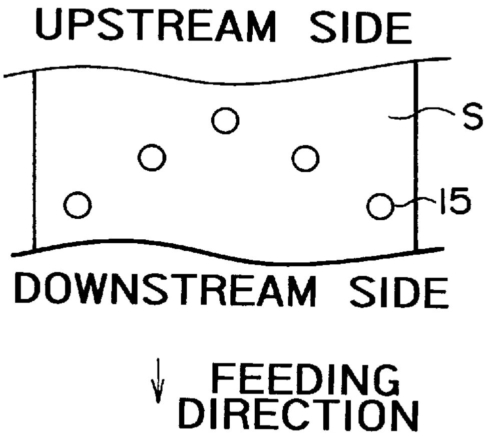

By using a plurality of the nozzles 15, the region in which the solid particles collide with the transfer printing sheet can be made to have the desired shape. In the transfer printing system for curved surfaces as shown in FIG. 1A, the nozzles are arranged linearly in one row, vertically to the direction in which the transfer printing sheet and the base are fed, thereby linearly forming a belt-like collisional region in the width direction. For instance, FIG. 2A shows a constitution in which the nozzles are arranged in two rows in the direction of feed in order to extend the collisional region in the direction of feed. FIG. 2B shows an arrangement in which the nozzles are provided in one row but arranged so that the collision at the central part in terms of width direction can be caused upstream in the direction of feed. In this arrangement, the pressure contact of the transfer printing sheet with the base begins at the central part in terms of width direction, and gradually shifts toward both ends in terms of width direction. By this, it is possible to prevent the transfer printing sheet from being adhered to the base while holding air between them at the central part in terms of width direction.

Figure 3:
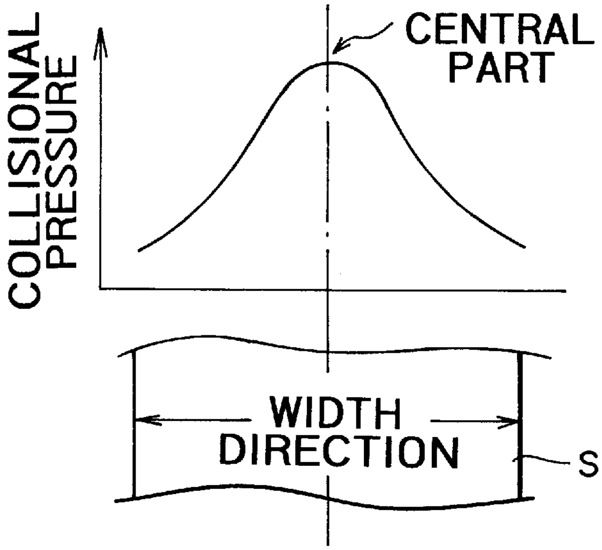
FIG. 3 is a graph showing one example of the distribution in the width direction of collisional pressure of solid particles.

It is not necessary to make the collisional pressure of the solid particles uniform within the collisional region. FIG. 3 shows an example of the mountain-shaped pressure distribution in which the collisional pressure is maximum at the central part in terms of width direction, and decreases toward both ends in terms of width direction. The collisional pressure is adjusted by controlling the degree of opening or closing of a valve, the size of the inner diameter of a pipe to which the valve is attached and through which the solid particles are carried, or the speed of the solid particles and gas stream jetted from the nozzles, controllable by the gas pressure just before the nozzles by using a pressure regulator or the like. When the pressure is so controlled that the distribution thereof will be as shown in FIG. 3, there can be obtained the similar effects to those obtained in the case shown in FIG. 2B. In the conventional transfer printing method for curved surfaces, using a rubber-made transfer roller, if the diameter of the transfer roller at the central part thereof is made larger than the other part, a higher pressure can be applied to the central part. However, the length of circumference at the central part becomes different from that of circumference at both ends, so that the transfer printing sheet to which pressure is applied by the contact of the roller cannot be uniformly carried.

Figure 4:
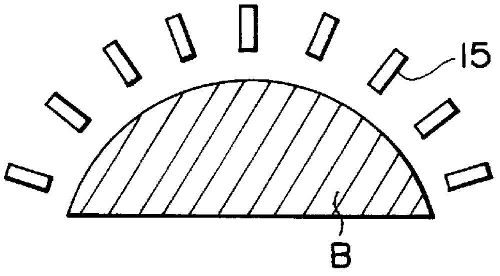
FIG. 4 is an illustration showing one type of directions in which particles are injected.

Further, in the transfer printing system for curved surfaces as shown in FIG. 1A, the nozzles are horizontally arranged in a row because the base if a flat plate. This is an arrangement in which the solid particles are caused to vertically collide with the transfer-printing-pattern-receiving surface of the base. The reason why the solid particles are caused to collide vertically is basically that the collisional pressure can be utilized most effectively. Therefore, for example, when the transfer-printing-pattern-receiving surface of the base 1 (the shape of the section in the direction vertical to the direction of feed) is convex like a dome as shown in FIG. 4, it is better to prepare a plurality of nozzles and to arrange them vertically to the adjacent transfer-printing-pattern-receiving surface so that the solid particles can collide almost vertically with an individual collisional surface which is assigned to each nozzle. Thus, depending on the shape of irregularities on an objective base, it is better to arrange the nozzles in such a direction that the solid particles can collide almost vertically.

The nozzles are to eject the solid particles together with a gas stream. The nozzle can be, for example, a hollow cylinder, a multilateral square pillar, or a fishtail-shaped one.

Further, the nozzle may be either one having only one opening, or one whose inside is sectioned like honeycomb. The spraying pressure is generally about 0.1 to 1.0 kg/cm$^2$. Further, the solid particles, the transfer printing sheet, or the base may be electrostatically charged while the solid particles are carried and caused to collide with the transfer printing sheet. In order to prevent this static electrification, it is preferable to earth the nozzles 15, the discharge pipe 17, and the like, or to eliminate the static electricity by bringing a static-electricity-eliminating bar to the transfer printing sheet, or by incorporating, into the gas stream, ions having electric charge which can neutralize the static charge. The static elimination may be conducted before, during or after conducting transfer printing, when necessary.

Further, specific examples of decorative patterns which can be formed on bases having three-dimensional surface irregularities to produce decorative laminates include tile-like patterns, brick-like patterns, stucco-like patterns, patterns like scratching finish of stucco, grain-like patterns with cleaved faces of granite or the like, wainscotting-like patterns, and raised wooden grain-like patterns.

EXAMPLE 1

The present invention will now be described in greater detail by way of examples. First of all, a calcium silicate plate having three-dimensional surface irregularities 21 forming a brick-like pattern, in which the joint as exemplified in FIG. 5 forms a recess with a width of 7 mm and a depth of 0.5 mm was prepared as the base having three-dimensional surface irregularities. Onto the surface of this plate, 30 g/m$^2$ of an acrylic emulsion serving as both sealer and primer was coated. Further, as the transfer printing sheet, there was prepared a sheet by coating an ink comprising a pigment consisting of carbon black, red oxide, titanium white and chrome yellow, and a binder which was a mixture of acrylic resin and vinyl chloride-vinyl acetate copolymer resin in the weight ratio of 1:1 onto a polypropylene film having a thickness of 50 $\mu$m serving as the substrate to form on decorative layer having a brick-like pattern, and then gravure-printing on the decorative layer an adhesive layer having a thickness of 10 $\mu$m by the use of a heat-sensitive adhesive made from vinyl chloride-vinyl acetate copolymer resin.

Next, in the system shown in FIGS. 1A and 1B, the above-described base was horizontally placed with the irregular surface thereof facing up, and, on this base, the above-described transfer printing sheet was placed with the adhesive layer surface thereof facing down. Subsequently, the transfer printing sheet and the base were preheated from the transfer printing sheet side by radiation heat generated by a heating wire heater. Spherical nylon beads having a particle diameter distribution ranging from 0.2 to 0.8 mm were ejected as the solid particles from the nozzles together with air at room temperature, and allowed to collide with the back surface of the transfer printing sheet, thereby bringing the transfer printing sheet into pressure contact with the base. The spraying pressure was adjusted to 0.4 kg/cm$^2$; and the pressure distribution of the air stream was so controlled that it would be maximum at the central part in terms of width direction as shown in FIG. 3. After the transfer printing sheet was extended into the recess corresponding to the joint and closely adhered thereto, the substrate of the transfer printing sheet was separated, thereby obtaining a decorative laminate. A polyvinylidene fluoride emulsion coating was further coated onto the surface of the transfer-printed layer to the thickness of 10 $\mu$m to form a transparent protective layer. Thus, a decorative laminate with a transparent protective layer was obtained.

FIGS. 6A to 8 show a second embodiment of the transfer printing system for curved surfaces according to the present invention. The fundamental constitution of this embodiment is the same as that of the embodiment shown in FIGS. 1A and 1B; those components which are common to these two embodiments are indicated by the same reference numerals as used in FIGS. 1A and 1B, and not described any more.

The difference between this second embodiment and the first embodiment will now be described. This second embodiment employs an injector 33 which injects, from an injection guide 32, solid particles P accelerated by a particle accelerator 31 using a rotary impeller. The solid particles P injected from the injector 33 were allowed to collide with the substrate sheet side of the transfer printing sheet S for the application of collisional pressure, thereby pressing the transfer printing sheet S against the transfer-printing-pattern-receiving base B.

This transfer printing system for curved surfaces contains not only the heater 19 for the transfer printing sheet S but also a heater 41 for the base B. These heaters 19, 41 become heating means for activating adhesion power when the adhesive layer in the transfer printing layer is formed by the use of a heat-sensitive adhesive. Further, as a suction-evacuating means 50, a suction-evacuating nozzle 51 and a vacuum pump 52 are provided at the lower part of the passage along which the base B is carried, so that air vent between the transfer printing sheet S and the base B can also be attained. Furthermore, a base coater 60 which is used for coating a heat-sensitive adhesive to the base B is provided at the section from which the base is allowed to enter. The heater 41 also serves as a dryer for drying a solvent when the adhesive contains any solvent.

The base-feeding device 40 as a means for feeding the base is composed of a row of driving rotating carrier rollers, and successively carries the base B horizontally placed thereon to the position at which the solid particles injected from the injector 33 collide with the base.

In the case where the transfer printing sheet S is separated from the base B by a different device in a separate process, or in the case where the separation is conducted by manual operation, the release roller 10 can be omitted.

By the pressure-applying device 6, the solid particles P are caused to successively collide with the substrate sheet of the transfer printing sheet S, and the transfer printing sheet S is thus pressed against the irregular surface of the base B, caused to closely fit to the irregularities, and brought into pressure contact with the irregular surface. After the collision is completed, the solid particles P are recovered for reuse. The pressure-applying device 6 is composed of the above-described injector 33 which injects from the injection guide 32 the solid particles P accelerated by the particle accelerator 31, a hopper 12, a chamber 16, a discharge pipe 17, a separator 37 for separating a gas and the solid particles, a vacuum pump 18, and the like.

Figure 6A:
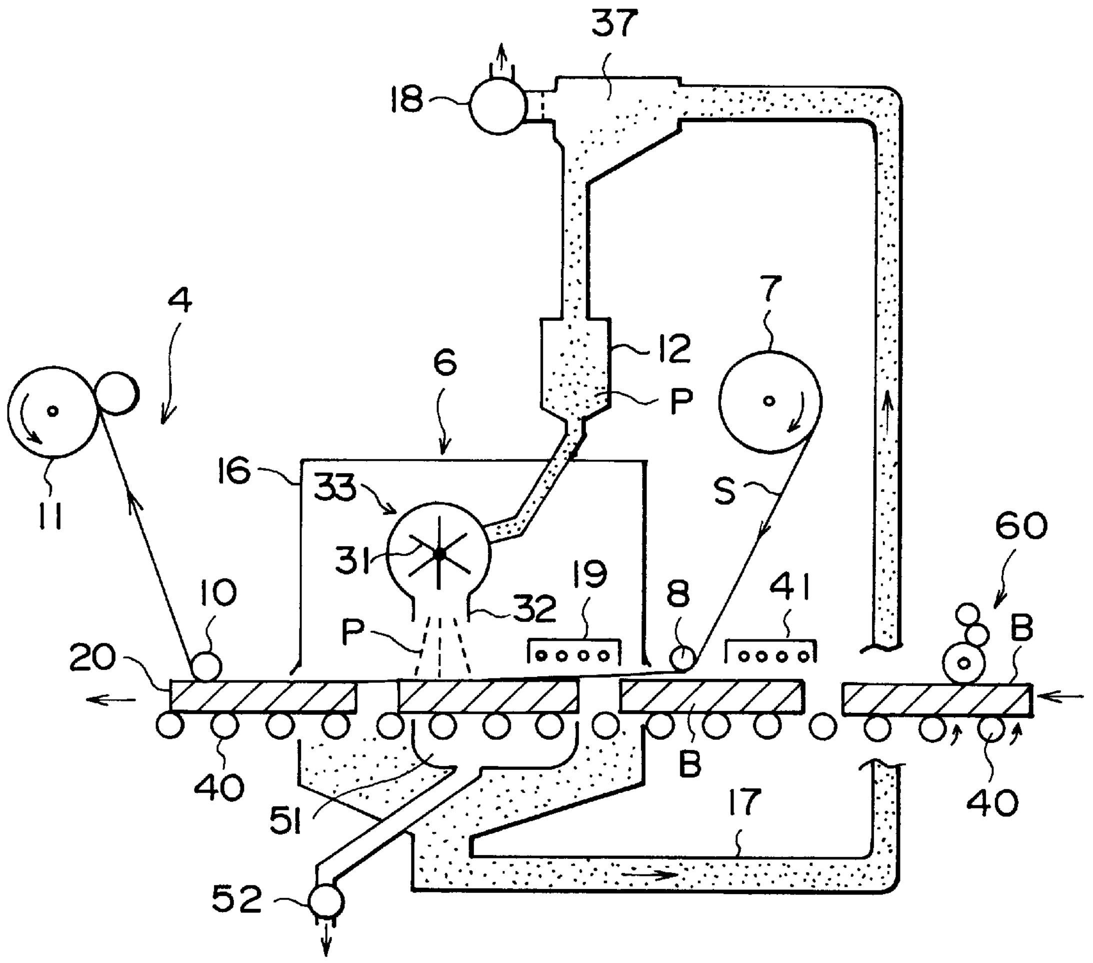
FIG. 6A is a schematic front view, partly in section, of a second embodiment of the transfer prniting system for curved surfaces according to the present invention.
Figure 6B:
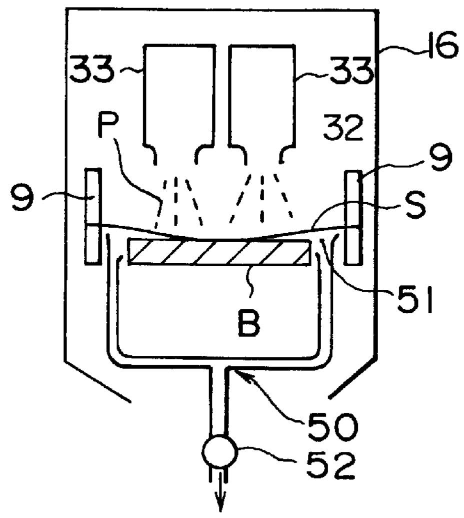
FIG. 6B is a vertical sectional side view of the pressure-applying device shown in FIG. 6A.

At least the particle accelerator 31 using an impeller is provided to the injector 33. In addition to this, it is possible to provide, when necessary, the injection guide 32 which has an opening only at the position at which the solid particles are injected and which covers the other part of the particle accelerator as shown in FIGS. 6A and 6B, thereby causing the solid particles to be accelerated by the particle accelerator 31 to inject from the injector in the same direction.

The shape of the opening of the injection guide 32 is, for example, a hollow columnar, prismatic, coned, pyramidal, or fishtail-like. The injection guide can be either one having only one opening, or one whose inside is sectioned like honeycomb. Further, in the case where the solid particles, the transfer printing sheet and the transfer-printing-pattern-receiving base are electrostatically charged while the solid particles are carried and caused to collide with the transfer printing sheet, it is preferable, in order to prevent this static electrification, to earth the discharge pipe 17 and so on, or to eliminate the static electricity by bringing a static-electricity-eliminating bar into contact with the transfer printing sheet or by incorporating, into the gas stream, ion having electrical charge which can neutralize the static charge. The static elimination may be conducted before, during or after conducting transfer printing.

Figure 7A:
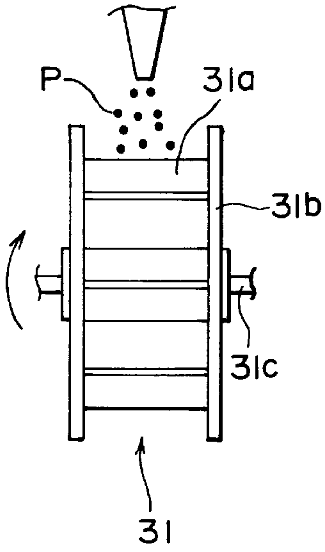
FIG. 7A is a side view of an impeller for use in the pressure-applying device.
Figure 7B:
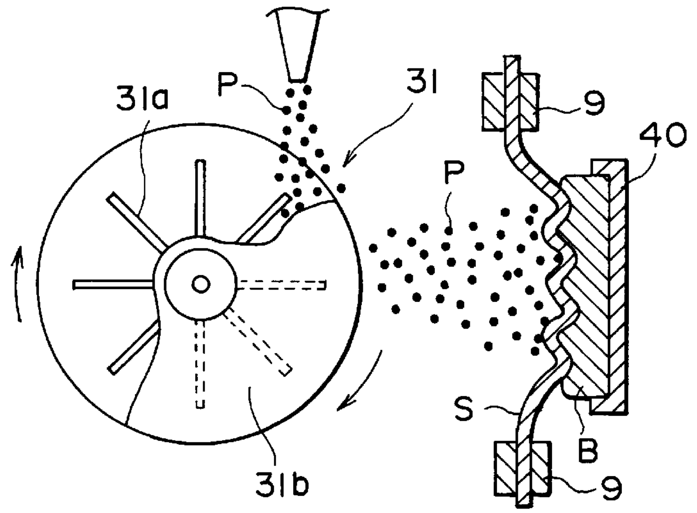
FIG. 7B is an explanatory view of an embodiment in which pressure is applied by the impeller shown in FIG. 7A.

The material of the impeller of the particle accelerator 31 can be properly selected from ceramics, metals such as steel and titanium, and the like depending upon the type of the solid particles to be used. The solid particles are accelerated when brought into contact with the impeller, so that it is better to use a ceramic-made impeller which is excellent in abrasion resistance when metallic beads or inorganic particles, which are hard in nature, are used as the solid particles. In the case where resin beads are used as the solid particles, a steel-made impeller can be used because such beads are softer than metallic particles. Although the typical shape of the blade 31*a* of the impeller 31 is a rectangular flat plate (rectangular parallelpiped) as shown in FIGS. 7A and 7B, a curved plate or a propeller-shaped plate such as a screw propeller can also be used; the shape of the blade is selected depending on the application or purpose. Further, the number of the blades 31*a* is two or more, and is generally selected from the numbers of 10 or smaller. By the combination of the shape, number and rotational speed of the impeller, and the feeding speed and direction of the solid particles, the direction in which the accelerated solid particles are injected, the injected speed, the angle of diffusion of the solid particles injected, and so on are controlled. In general, the solid particles are fed from the upper part of (right above or half above) the particle accelerator. Further, the solid particles can be injected vertically downward as shown in FIGS. 6A and 6B, horizontally as shown in FIGS. 7A and 7B, or obliquely downward (not illustrated).

Only the injector 33 may be enough depending on the area of the region to which collisional pressure is applied. However, in the case where the area is large, it is better to use a plurality of injectors in order to make the region on the transfer printing sheet with which the solid particles collide into the desired shape. For example, by linearly arranging the injectors in a plurality of rows, vertically to the direction in which the transfer printing sheet and the transfer-printing-pattern-receiving base are carried, the shape of the collisional region can be made to a wide belt-like shape, linear in the width direction. Alternatively, the injectors can be arranged in staggered fashion; or they can also be so arranged that the central part of the arrangement will be upstream of both ends in terms of width direction and that the pressure contact of the transfer printing sheet with the transfer-printing-pattern-receiving base can begin at the central part in terms of width direction and gradually shifts towards both ends in terms of width direction. By doing so, it is possible to prevent the transfer printing sheet from being closely adhered to the transfer-printing-pattern-receiving base with air including between them at the central part in terms of width direction. Further, in order to make the time for applying the collisional pressure longer, it is preferable to arrange the injectors in multiple rows of two or more as shown in FIG. 2A in the direction in which the transfer printing sheet and the transfer-printing-pattern-receiving base are carried.

Furthermore, also in this embodiment, it is not necessary to make the collisional pressure of the solid particles uniform within the collisional region as in the first embodiment. For instance, a mountain-like pressure distribution is acceptable, in which the collisional pressure becomes maximum at the central part in terms of width direction of the transfer printing sheet, and the collisional pressure decreases toward both ends in terms of width direction of the transfer printing sheet. In this case, the pressure contact is assisted to successively progress by stages from the high-pressure region (the central part in terms of width direction) to low-pressure region (both ends of the sheet). The collisional pressure is adjusted by controlling the speed of the solid particles which collide with the transfer printing sheet by changing the number of revolutions of the impeller, etc., or by controlling the number of the solid particles to be fed per unit time or the mass of one particle.

It is preferable to cause the solid particle P injected from the injectors 33 to vertically collide with the transfer-printing-pattern-receiving surface of the base B. This is because, by doing so, the collisional pressure can basically be utilized most effectively. Therefore, when the transfer-printing-pattern-receiving surface of the transfer-printing-pattern-receiving base is a convexly curved surface of dome type like in the case shown in FIG. 4, it is possible to prepare a plurality of injection guides 32 for the convexly curved surface, and to arrange the injectors so that the solid particles injected from the injection guides can collide with the transfer-printing-pattern-receiving surface almost vertically.

Further, although the acceleration and injection of the solid particles by the particle accelerator 31 can also be conducted in vacuum by making the chamber 35, the particle accelerator 31 and their surroundings vacuum, it is preferable to inject the solid particles together with an air stream by feeding the solid particles P along with air by rotating the impeller in the air.

In general, the diameter of the impeller is about 5 to 50 cm; the width of the blade is approximately 5 to 20 cm; the length of the blade is almost the same as the diameter of the impeller; and the number of revolutions of the impeller is approximately 50 to 5000 rpm. The speed at which the solid particles are injected is from 10 to 50 m/s; and the injection density is approximately 10 to 150 $kg/m^2$.

After colliding with the transfer printing sheet S, the solid particles P gather at the bottom of the chamber 16; they are sucked up by the vacuum pump 18, and carried to the separator 37 through the discharge pipe 17. In the separator 37, they are separated from the air. Thereafter, the solid particles are collected in the original hopper 12, and stored in the same for reuse. Except the inlet and outlet ports for the transfer printing sheet S and the base B, the chamber 16 covers the base B and transfer printing sheet S to be subjected to transfer printing, and the injectors 33 so that the solid particles P injected from the injectors 33 will not run out.

In the second embodiment, a base coater 60 and a base heater 41 (serving also as a dryer) are provided upstream of the pressure-applying section 6 in such a manner that the base coater is positioned upstream of the base heater. The heater 41 can be the same as the sheet heater 19. The base coater 60 is used for coating a heat-sensitive adhesive or a primer to the base B. In the case where a heat-sensitive adhesive is applied to the base B, the base heater 41 also serves as a means for heating the heat-sensitive adhesive. The heater 41 heats the transfer-printing-pattern-receiving base B. In the case where it is necessary to dry any volatile component such as a solvent when an adhesive is applied by means of solution coating, or in the case where it is necessary to dry any volatile component of a primer, the heater 41 can also serve as a dryer. In the case where neither a heat-sensitive adhesive nor a primer is applied to the transfer-printing-patter-receiving base when transfer printing is conducted, it is possible to omit the base coater 60. The base heater 41 can also be omitted when it is not necessary to heat the transfer-printing-pattern-receiving base or to conduct drying. When both the coating of a heat-sensitive adhesive and that of a primer are conducted, the system can be made to a continuously-processable system by providing one more substrate coater, and, if necessary, a proper dryer (not illustrated) upstream of the base coater 60. The primer coating is conducted prior to conducting transfer printing for the purposes of coloring the transfer-printing-pattern-receiving base, carrying out a primer treatment for promoting adhesion, and carrying out a filling treatment.

Next, the transfer printing method for curved surfaces, using the system according to the second embodiment as described above will be described.

The plate-like transfer-printing-pattern-receiving base B whose transfer-printing-pattern-receiving surface have irregularities is carried by the base-carrying device 40 one by one to the base coater 60, by which a heat-sensitive adhesive is applied to the base. When the adhesive contains a solvent, the volatile component is dried by means of evaporation by the base heater 41 concurrently with the thermal activation of the base and that of the heat-sensitive adhesive. It is also possible to continuously conduct, before applying the adhesive, primer coating, or sealer coating which is conducted prior to primer coating by connecting a plurality of base coaters 60 and base heaters 41. The transfer-printing-pattern-receiving base B is carried and fed to the chamber 16 of the pressure-applying section 6.

By applying tension by the sheet-feeding device 4, the transfer printing sheet S is unwound from the feed roll set in the sheet feeder 7, and carried to the chamber 16 of the pressure-applying section 6 via the guide roller 8. In the case where a heat-sensitive adhesive is applied to the transfer printing sheet when transfer printing is conducted, the adhesive is applied to the transfer printing sheet by an adhesive applicator while the transfer printing sheet is fed to the pressure-applying section 6 from the sheet feeder 7; and, if it is necessary to dry the adhesive, the transfer printing sheet is fed to the pressure-applying section after the adhesive is dried up by the dryer.

After entering the chamber 16, the transfer printing sheet S is carried in parallel with the transfer-printing-pattern-receiving base B at the same speed as the speed at which the base B is fed, while supporting the transfer printing sheet S by the use of the sheet holder 9 by sandwiching both ends, in terms of width direction, of the transfer printing sheet, and thus keeping a slight space between the transfer printing sheet S and the base B by causing the transfer printing sheet S to float on the base B, with the adhesive layer side surface of the transfer printing sheet S facing the base B. Before receiving collisional pressure, the transfer printing sheet S is heated by the sheet heater 19 after it is carried while being supported by the sheet holders 9. Further, the sheet heater 19 shown in this figure has such a structure that it heats the transfer printing sheet while the transfer-printing-pattern-receiving base B and the transfer printing sheet S, which are close to each other, are carried, so that the heat-sensitive adhesive on the transfer-printing-pattern-receiving base is also heated. Therefore, the heating serves to enhance the stretchability of the sheet and to activate the heat-sensitive adhesive. The transfer printing sheet is also heated indirectly by the transfer-printing-pattern-receiving base which is heated by the base heater 41 and fed to the pressure-applying section 6.

When the transfer printing sheet is carried in the vicinity of the transfer-printing-pattern-receiving base at the same speed, whether a slight space is provided between them or not is selected in consideration of the shape of the surface irregularities, the preheat temperature of the transfer-printing-pattern-receiving base, the thermal deformation properties of the transfer printing sheet, the collisional pressure of the solid particles, the activation temperature of the heat-sensitive adhesive, and the like. Further, in order to make the above-described selection, the system is so made that the distance between the transfer-printing-pattern-receiving base and the transfer printing sheet which are being carried is adjustable.

Next, the transfer printing sheet S is subjected to the collision of the solid particles P injected from the injector 33. The rate of change of momentum of these solid particles when they collide becomes the collisional pressure by which the transfer printing sheet S is pressed against the base B. The transfer printing sheet is thus pressed against the transfer-printing-pattern-receiving base by the collisional pressure of the solid particles, and deformed by being extended into the inside of recessed portions on the irregular surface of the transfer-printing-pattern-receiving base. The transfer printing sheet is thus shaped to that it can closely fit to the shape of the irregular surface, and closely adhered to the transfer-printing-pattern-receiving base through the heat-sensitive adhesive which has been activated to show adhesiveness, whereby the transfer printing sheet is brought into pressure contact with the transfer-printing-pattern-receiving base.

It is a matter of course that, when transfer printing is required only on raised portions on the transfer-printing-pattern-receiving base and not required in recessed portions, it is not necessary to shape the transfer printing sheet so that it can closely fit to the irregular surface completely, and to completely adhere it to the entire surface of the base.

After being used for the collision with the transfer printing sheet S, the solid particles P gather at the bottom of the chamber 16 via the sides of the sheet holders 9, and sucked up to the original hopper 12 through the discharge pipe 17. The air present in the chamber 16 is also sucked up as a gas for carrying the solid particles P together with the solid particles P, and carried through the discharge pipe 17 to the separator 37 for separating the air stream and the solid particles from each other, positioned at the upper part of the hopper 12. The solid particles P carried by the air stream are horizontally discharged from this separator 37 into a cavity in the system, and those solid particles which have high densities (or specific gravities) relative to the gas fall due to their own weights, while the gas flows horizontally as it is and exhausted to the outside of the system by the vacuum pump 18 after the remaining solid particles P which move along the air stream are filtered off by a filter. The solid particles are thus prevented from running out, together with the air, from the opening of the chamber 16 serving as the inlet and outlet ports for the transfer printing sheet and the transfer-printing-pattern-receiving base.

After the base B to which the transfer printing sheet S is closely adhered goes out of the chamber 16, the substrate sheet of the transfer printing sheet S is separated from the base B by the use of the release roller 10. Thus, a decorative laminate 20 in which the transfer printing layer of the transfer printing sheet is adhered to the transfer-printing-pattern-receiving base through the heat-sensitive adhesive can be obtained.

Any heater can be used as the sheet heater 19 and the base heater 41, which are heating means to be used before the application of collisional pressure. Further, these heating means can be provided at any position such as the surface side, the back side, or the surface and back sides of the transfer printing sheet or of the transfer-printing-pattern-receiving base. Furthermore, even when the collisional pressure is applied by the use of heated solid particles, heat sources for the heaters can be dispersedly provided between the injectors. In the case where hot-air heating is conducted in the chamber, it is better to make the spraying air flow small. This is because, if not only the air to be used for spraying the solid particles but also extra air is allowed to enter in the chamber, the load applied to the vacuum pump used for recovering the solid particles is increased.

The heater for preheating the transfer printing sheet or the base can be provided an outside but before the chamber, or inside the chamber, or both outside and inside the chamber. If the heater is provided at both the outside and the inside of the chamber, it is possible to heat the transfer-printing-pattern-receiving base while it is carried on a long distance, especially when sufficient preheating is needed in such a case where the transfer-printing-pattern-receiving base has large heat capacity. If it is necessary to make the internal volume of the chamber itself large in order to provide a long heater in the chamber, it is favorable to provide a part of or all of the heater at the outside of the chamber to make the internal volume of the chamber small, from the viewpoint of operation when the scattering, recovery, etc. of the solid particles are taken into consideration. Further, the advantage of providing the heater in the chamber is that it is possible to heat the transfer printing sheet and the base until just before the application of collisional pressure or even during the application of the same, especially when it is tried to effectively heat only the vicinity of the transfer-printing-pattern-receiving surface of the base having a large heat capacity.

In the case where the adhesive used for forming the adhesive layer of the transfer printing layer is not liquid, or in the case where a hot-melt adhesive is preheated to such a degree that it is not activated, it is better to "remover air" for removing the air present in those vacant spaces which are formed between the transfer printing sheet and the base when the transfer printing sheet is brought into contact with the irregular surface of the base. By removing the air, it is possible to prevent "inclusion of air" which is caused when air is remaining between the transfer printing sheet S and the base B after transfer printing is completed, and to further prevent the formation of voids in the transfer-printed pattern which is caused by the inclusion of air. The removal of air is conducted by a suction-exhausting means 50 composed of a suction-exhausting nozzle 51, a vacuum pump 52 and the like as shown in FIGS. 6A and 6B. The suction-exhausting nozzle 51 is provided on the transfer printing layer side of the transfer printing sheet, in the vicinity of both sides of the transfer-printing-pattern-receiving base, in the direction in which the transfer-printing-pattern-receiving base is carried. The air present between the transfer printing sheet and the transfer-printing-pattern-receiving base is sucked up by the vacuum pump 52, and exhausted. When the outer periphery of the opening of the suction-exhausting nozzle 51 is surrounded by, for example, brush, and when the tip of the brush is brought into contact with the transfer-printing-pattern-receiving base and the transfer printing sheet, the air can be removed without adversely affecting the carrying of them. Further, it is better to conduct the removal of air even during the application of collisional pressure. The removal of air and the preheating of the transfer printing sheet can be started in any order depending upon the speed at which the transfer printing sheet is softened by preheating, or the degree of softening, and these two can also be started at the same time. The removal of air is effective when the transfer-printing-pattern-receiving surface of the transfer-printing-pattern-receiving base has an irregular surface of rock-surface type, stucco-type, or the like.

Further, in the case where an adhesive such as a hot-melt adhesive whose adhesion is fixed by cooling is used for forming the adhesive layer on the transfer-printing-pattern-receiving base or on the transfer printing layer, after the transfer printing sheet is closely adhered to the desired transfer-printing-pattern-receiving surface of the transfer-printing-pattern-receiving base, it is closely fitted even to the inside of recessed portions and fixed by cooling, and the substrate sheet of the transfer printing sheet can be separated and removed in a shorter time. It is thus possible to prevent the formation of voids while transfer printing is conducted, and to increase the production speed.

In order to attain the above, it is better to use, during the application of collisional pressure, cooled solid particles without releasing the collisional pressure, or to cool the adhesive layer by using another cooling means after the application of collisional pressure. In the case where the heat capacity of the transfer-printing-pattern-receiving base is large, it is possible to cool it from the back surface thereof not only by the use of cooled solid particles but also by spraying a low-temperature gas, or by cooling the rollers or belt conveyor for carrying the base. Alternatively, it is possible to cool the transfer-printing-pattern-receiving base by spraying cold air from the surface or back surface thereof at the outside of the chamber after subjecting it to the above-described cooling in the chamber, or without cooling it in the chamber.

The above-described transfer printing method and system for curved surfaces according to the present invention are not limited to the examples shown in the accompanying figures. For example, in the description of the transfer printing method for curved surfaces, using the transfer printing system for curved surfaces as shown in FIG. 6A, there have been described a system and a method in which the pressure contact of the transfer printing sheet with the transfer-printing-pattern-receiving base is conducted while they are carried. However, in the method and system according to the present invention, it is possible to conduct the pressure contact of the transfer printing sheet with the transfer-printing-pattern-receiving base intermittently by suspending the carrying of the transfer printing sheet and the transfer-printing-pattern-receiving base (for example, the position of the injector is shifted). Further, the positional relationship between the transfer printing sheet and the direction in which the solid particles are injected from the injector is not limited to one in which the transfer printing sheet is placed horizontally, and the solid particles are vertically injected toward just below from the upper part of the transfer printing sheet. Even if the direction in which the solid particles are injected is maintained vertical to the back surface of the transfer printing sheet, the transfer printing sheet can be placed or carried not only in a horizontal direction but also in an oblique or up-and-down direction. Moreover, the transfer printing sheet can be placed and carried horizontally with its back surface facing down; that is, the solid particles can be injected from down to up. It is of course possible to inject the solid particles at any angle with the back surface of the transfer printing sheet.

Further, by the use of a transfer-printing-pattern-receiving base on which the adhesive layer is partly formed, or of a transfer printing sheet on which the transfer printing layer or the adhesive layer of the transfer printing layer is partly formed, a decorative laminate to which the transfer printing layer is partly transferred can be obtained. For the partial formation, not only a coating method but also a printing method is used. Further, to attain the partial transfer of the transfer printing layer, a transfer printing sheet prepared by partly providing a release layer made from fluororesin, silicon resin, or the like on the transfer printing layer may be used.

EXAMPLE 2

Figure 5A:
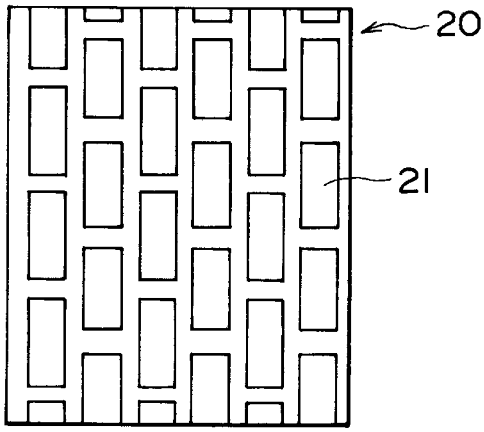
FIG. 5A is a plan view showing one example of surface irregularities on a base.

As the transfer-printing-pattern-receiving base B having three-dimensional surface irregularities, there was prepared a calcium silicate plate having three-dimensional surface irregularities which were forming a brick pattern, the joint thereof being a channel-like recess as exemplified in FIG. 5, the irregular surface thereof being undercoated and primer-coated with an acrylic urethane resin. These coating operations were conducted by a separate off-line device.

As the transfer printing sheet, there was prepared a sheet by successively gravure-printing a brick-like pattern to form a decorative pattern layer which would be the transfer printing layer on one surface of a polypropylene thermoplastic elastomer film having a thickness of 50 $\mu$m, serving as the substrate.

Figure 8:
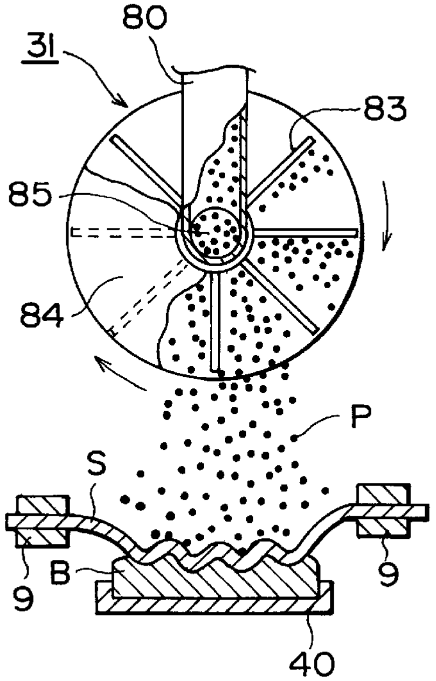
FIG. 8 is an explanatory view of another embodiment in which pressure is applied by another impeller.

Next, in a system including the steps as shown in FIGS. 6A and 6B, wherein the application of collisional pressure is conducted by using an device as shown in FIGS. 7A and 8, the above-described base B was placed on the base-carrying device 40 composed of a row of carrier rollers with its irregular surface facing up, and carried. By the base coater 60, a solvent-free hot-melt-type heat-sensitive adhesive which had been melted by heating was coated onto the base. Thereafter, the heat-sensitive adhesive and the transfer-printing-pattern-receiving base were heated by the base heater 41, and the base was fed to the pressure-applying section 6. On the other hand, the transfer printing sheet S was also fed to the pressure-applying section 6 with the substrate side thereof facing up. When the base B entered in the chamber 16, the transfer printing sheet S was brought close to the base B. The transfer printing sheet S was held between a pair of endless belts of the sheet holder 9 so that the transfer printing sheet S would be sandwiched. Under such a condition, the preheating of the transfer printing sheet S, or the activation of the heat-sensitive adhesive, and the heating of the transfer-printing-pattern-receiving base were conducted by applying, from the substrate sheet side of the transfer printing sheet S, radiation heat generated by the sheet heater 19 using a heating wire heater.

Subsequently, spherical iron beads having an average particle diameter of 0.8 mm were injected as the solid particles P from the injector 33 using as the particle accelerator a titanium-made rotary impeller, and allowed to collide with the substrate sheet of the transfer printing sheet S, whereby the transfer printing sheet was pressed against the surface irregularities of the base B. The particle accelerator 31 as shown in FIGS. 7A and 7B was used. The beads placed in the hopper were fed by allowing them to free fall from right above the impeller, at the position horizontally far from the rotating shaft 31 at a distance of 60% of the radius of the impeller, and 10 cm above the topmost of the impeller, whereby the accelerated solid particles were horizontally injected at a speed of 40 m/s. The number of revolutions of the impeller was 3600 rpm; the diameter of the impeller was 20 cm; and the width of the blade 31*a* was 10 cm. Both the transfer printing sheet S and the base B were carried while supporting them with their surfaces being maintained vertical as shown in FIGS. 7A and 7B.

The transfer printing sheet was extended into the recess corresponding to the joint, and closely adhered thereto. The resultant was taken out from the chamber 16, and the adhesive layer was cooled and solidified. Thereafter, the substrate sheet of the transfer printing sheet was separated by the release roller 10 to obtain a decorative laminate 20.

Figure 9:
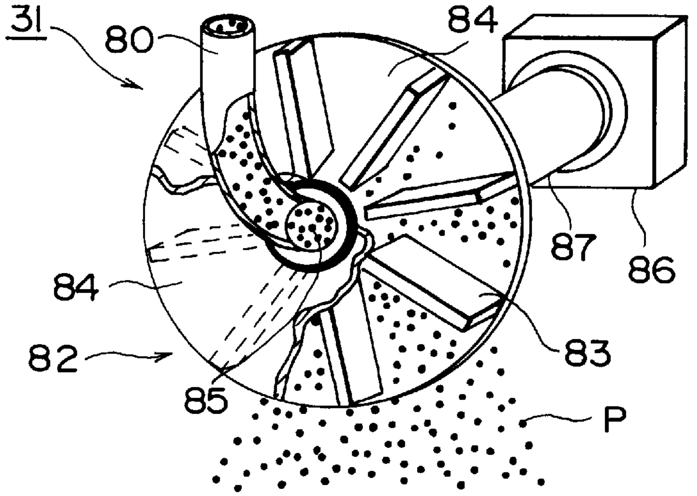
FIG. 9 is a perspective side view, with a part broken away, of the impeller shown in FIG. 8.

FIGS. 8 and 9 show another example of the particle accelerator 31. The particle accelerator 31 is composed of an impeller, and a rotation driving source for rotating the impeller such as a motor. As the particle accelerator 31, a certain type of centrifugal blasting machines useful for spraying powders for sand blasting can be employed. An impeller 82 which can serve as the particle accelerator 31 is shown in FIGS. 8 and 9.

The impeller 82 has a plurality of blades 83 which are fixed by two side plates 84 at their both ends, and the center of rotation of the impeller forms a hollow section 85 in which no blades 83 are present. To this hollow section 85, the solid particle P are fed from the hopper or the like through a transport pipe 80. To the center of rotation of the above-described side plates 84 is fixed a rotary shaft 87 which is supported by a bearing 86 in such a manner that it can be freely rotated and which is driven to rotate by a rotation power source such as an electric motor (not illustrated). The impeller 82 is thus rotatable. Further, the rotary shaft 87 does not penetrate the space between the two side plates 84, in which the blades 83 are present, and forms a non-shaft space. The solid particles P fed to the hollow section 85 are introduced into the space between the blades 83, and accelerated by the rotational force of the impeller 82 when they are reached, by the action of the rotating impeller, the blades which are present at the outside of the hollow section 85. The solid particles P are thus injected from the impeller 82. In FIG. 9, the rotary shaft 87 is connected only to the outside of the side plates 84, and does not penetrate the hollow section 85. However, it is also possible to adopt such a structure that a rotary shaft whose diameter is smaller than that of the hollow section 85 is allowed to penetrate even the hollow section 85, or that a hollow cylindrical rotary shaft having, at the outer periphery thereof, an opening through which the solid particles can pass is used as the hollow section.

The shape of the blade 83 is typically a rectangular flat plate (rectangular parallelpiped). However, a plate with curved surfaces, a propeller-like plate such as a screw propeller, or the like can also be used as the blade 83; the shape of the blade 83 is selected depending upon the application or purpose. Further, the number of blades is two or more, and generally selected from the numbers of approximately 10 or smaller. By the combination of the shape of the impeller, the number of the blades, the rotary speed of the impeller, the speed at which the solid particles are fed, and the direction in which the solid particles are fed, the direction in which the accelerated solid particles are injected (sprayed), the injection speed, the angle at which the solid particles are injected and diffused, and the like are controlled. In general, the solid particles are fed from the upper part of (right above or half above) the particle accelerator.

Figure 10A:
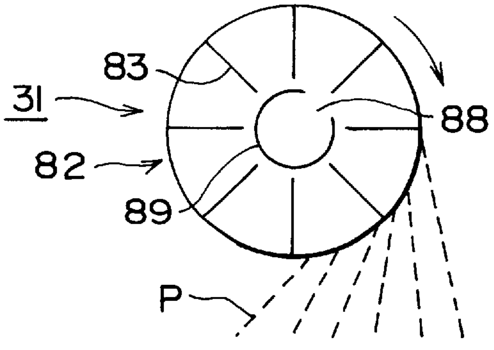
FIGS. 10A and 10B are illustrations showing embodiments in which the blades of the impeller shown in FIG. 9 are arranged differently.
Figure 10B:
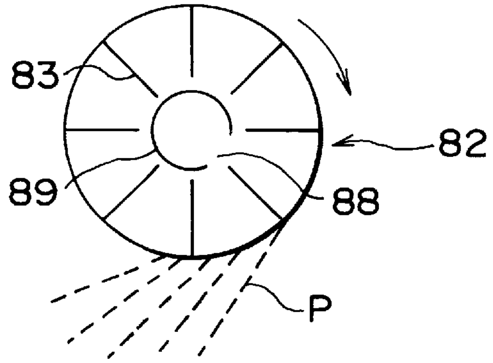

The direction in which the solid particles are injected is almost vertically downward in the example shown in FIGS. 8 to 10A. However, this direction can be made horizontal or obliquely downward (not illustrated). To control the direction in which the solid particles P are injected, a hollow cylindrical directional controller 89 which can rotate independently on the impeller, the center of rotation of the shaft of the directional controller being the same as that of the shaft of the impeller, a part of the outer periphery of the directional controller being opened in the direction of circumference to form an opening 88, can be provided between the hollow section 85 and the blades 83 which are present at the outside of the hollow section 85, thereby controlling the direction in which the particles P are sprayed by adjusting the direction of the opening of the directional controller 89. FIGS. 10A and 10B show an embodiment in which the direction in which the solid particles are injected is controlled by the directional controller 89. In these figures, each directional controller 89 is fixed at the position shown in each figure. It is of course possible to cover the outer periphery of the impeller with the injection guide 32 as shown in 6A except the direction in which the solid particles are injected. Further, by controlling the size of the opening in the directions of circumference and width of the directional controller 89, the quantity of the solid particles to be injected can be controlled.

EXAMPLE 3

Figure 5B:
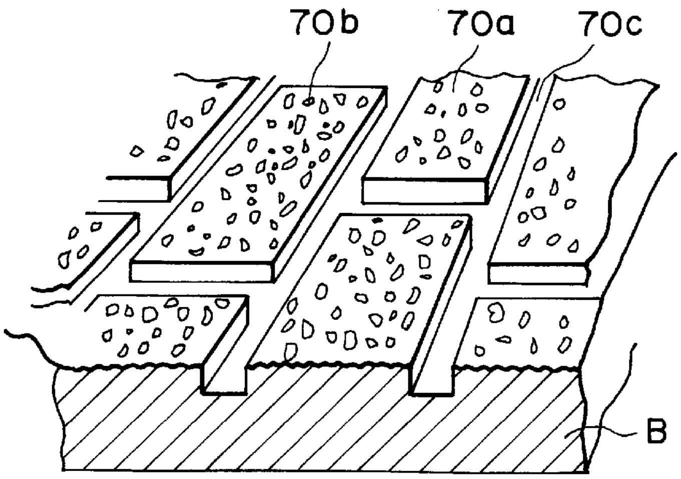
FIG. 5B is a perspective side view showing another example of surface irregularities on a base.

A calcium silicate plate having a thickness of 15 mm was firstly prepared as the transfer-printing-pattern-receiving base B having three-dimensional surface irregularities. The entire shape (the enveloping surface) of this flat plate was a rectangular parallelpiped, and the irregular surface of the plate had large irregularities and fine irregularities which were overlapped each other. The base was a flat plate having three-dimensional irregularities forming a brick-like pattern, in which large irregularities were composed of a channel-like recess corresponding to the joint as shown in FIG. 5B, having a width of opening of 5 mm and a depth of 2 mm, and flat raised portions 70*a* of 50 mm×150 mm, and satin-like fine irregularities 70*b,* the 10 point average roughness thereof under JIS-B-0601 being 500 $\mu$m on only the raised portions 70*a.* This plate was undercoated and primer-coated by a separate off-line device.

As the transfer printing sheet, there was prepared a sheet by successively gravure-printing a brick-like pattern to form a decorative layer which would be the transfer printing layer on one surface of a polypropylene thermoplastic elastomer film having a thickness of 50 $\mu$m, serving as the substrate.

Next, in a system including the steps as shown in FIGS. 6A and 6B, in which the application of collisional pressure is conducted by using the device as shown in FIGS. 8 to 10B, the above-described base B was placed on the base-carrying device 40 composed of a row of carrier rollers with its irregular surface facing up, and carried. By the base coater 60, a solvent-free hot-melt-type heat-sensitive adhesive which had been melted by heating was coated onto the base B by means of hot-melt coating by the use of an applicator without using any solvent, and the heat-sensitive adhesive and the transfer-printing-pattern-receiving base were heated by the base heater 41. The base B was then fed to the collisional-pressure-applying section 6. On the other hand, the transfer printing sheet S was also fed to the collisional-pressure-applying section 6 with the substrate sheet side thereof facing up. When the transfer-printing-pattern-receiving base B entered in the chamber 16, the transfer printing sheet S was brought close to the base B. The transfer printing sheet S was held between a pair of endless belts of the sheet holder 9 so that the transfer printing sheet would be sandwiched. Under such a condition, the preheating of the transfer printing sheet, the activation of the heat-sensitive adhesive, and the heating of the transfer-printing-pattern-receiving base were conducted by applying, from the substrate sheet side of the transfer printing sheet S, radiation heat generated by the sheet heater 19 using a heating wire heater.

Subsequently, spherical zinc beads having an average particle diameter of 0.4 mm were injected as the solid particles P from the injector 33 using as the particle accelerator a titanium-made rotary impeller, and allowed to collide with the substrate sheet of the transfer printing sheet S, whereby the transfer printing sheet S was pressed against the surface irregularities on the base B. The particle accelerator as shown in FIGS. 8 to 10B was used. The beads serving as the solid particles, placed in the hopper were fed by allowing them to free fall into the hollow section provided at the central part of the rotary shaft of the impeller, and the accelerated solid particles were vertically injected at a speed of 40 m/s. The number of revolutions of the impeller was 3600 rpm; the injection density was 100 kg/m$^2$; the diameter of the impeller was 20 cm; and the width of the blade 83 was 10 cm. The transfer printing sheet S and the base B were carried while supporting them with their surfaces being maintained horizontal as shown in FIG. 6A.

The transfer printing sheet S was extended into the recess corresponding to the joint, and closely adhered thereto. The resultant was taken out of the chamber 16, and the adhesive layer was cooled and solidified. Thereafter, the substrate sheet of the transfer printing sheet S was separated by the release roller 10 to obtain a decorative laminate 20.

According to the present invention, decorative laminates whose surfaces have large three-dimensional irregularities are decorated can easily be obtained. It is of course possible to easily obtain decorative laminates having two-dimensional irregularities, useful for window frames, sashes, etc. In addition to these flat decorative laminates, even those ones which are entirely corrugated like roof tiles or which are curved convexly or concavely can easily be obtained. Further, continuous production can be attained. Moreover, parts such as rollers are scarcely abraded by the irregularities of bases unlike in the conventional pressing method using a rubber roller.

What is claimed is:

1. A transfer printing method for curved surfaces, useful for transferring a transfer printing sheet to an irregular surface of a transfer-printing-pattern-receiving base, comprising the steps of:

preparing a transfer printing sheet comprising a substrate sheet, and a transfer printing layer formed on a surface of the substrate sheet, causing the side of the transfer printing layer of the transfer printing sheet to face the irregular surface of the base;

causing solid particles to collide with the substrate sheet of the transfer printing sheet; and bringing the transfer printing sheet into pressure contact with the irregular surface of the base by utilizing the pressure developed by the collision, thereby transferring the transfer printing sheet to the base.

2. The transfer printing method for curved surfaces according to claim 1, comprising the steps of:

carrying the base; and feeding the transfer printing sheet in parallel with the base which is being carried.

3. The transfer printing method for curved surfaces according to claim 2, comprising the steps of:

carrying the transfer printing sheet to the position at which it is brought into contact with the base through a gradually-decreasing space between the transfer printing sheet and the base; and causing the solid particles to collide with the transfer printing sheet at the position at which the transfer printing sheet is brought into contact with the base.

4. The transfer printing method for curved surfaces according to claim 1, wherein the collision of the solid particles is caused by injecting the solid particles from nozzles.

5. The transfer printing method for curved surfaces according to claim 1, wherein the collision of the solid particles is caused by accelerating the solid particles by a rotating impeller.

6. The transfer printing method for curved surfaces according to claim 1, wherein the solid particles after caused to collide with the transfer printing sheet are recovered and reused.

7. The transfer printing method for curved surfaces according to claim 1, wherein the collision of the solid particles with the transfer printing sheet is conducted in a chamber.

8. The transfer printing method for curved surfaces according to claim 1, wherein at least one of the transfer printing sheet and the base is heated before conducting the collision of the solid particles.

9. The transfer printing method for curved surfaces according to claim 1, wherein air is sucked up and exhausted from the region in which the collision of the solid particles is conducted.

10. The transfer printing method for curved surfaces according to claim 1, wherein the collision of the solid particles is caused at a plurality of positions on the transfer printing sheet in the width direction thereof.

11. The transfer printing method for curved surfaces according to claim 10, wherein the collision of the solid particles at a plurality of positions on the transfer printing sheet in the width direction thereof is caused at different positions in the direction in which the transfer printing sheet is carried.

12. The transfer printing method for curved surfaces according to claim 10, wherein the strength of the collision of the solid particles is caused to increase toward the central part, in terms of width direction, of the transfer printing sheet.

13. A transfer printing system for curved surfaces, useful for transferring a transfer printing sheet to the irregular surface of a transfer-printing-pattern-receiving base, comprising:

a pressure-applying device having means for injecting solid particles, a base-feeding device by which the base is carried to the position in front of the pressure-applying device with the irregular surface of the base facing the pressure-applying device, and a transfer printing sheet feed by which the transfer printing sheet is fed between the pressure-applying device and the irregular surface of the base which has been carried to the position in front of the pressure-applying device.

14. The transfer printing system for curved surfaces according to claim 13, wherein the means for injecting the solid particles comprises nozzles.

15. The transfer printing system for curved surfaces according to claim 14, wherein the nozzles are connected to means for feeding the solid particles to the nozzles, and to an air-blowing means for sensing air for injection to the nozzles.

16. The transfer printing system for curved surfaces according to claim 13, wherein the means for injecting the solid particles comprises an impeller which is driven to rotate so that the solid particles can be accelerated.

17. The transfer printing system for curved surfaces according to claim 16, comprising a device for feeding the solid particles to the central part of rotation of the impeller.

18. The transfer printing system for curved surfaces according to claim 17, comprising, at the center of rotation of the impeller, a hollow cylindrical directional controller which is provided in such a manner that it can be freely rotated so that it can receive the solid particles fed and which has an opening partly formed in the direction of circumference.

19. The transfer printing system for curved surfaces according to claim 13, comprising particle-discharging means for collecting the solid particles which have been injected from the means for injection.

20. The transfer printing system for curved surfaces according to claim 19, wherein the particle-discharging means is connected to the means for injecting the solid particles in the pressure-applying device.

21. The transfer printing system for curved surfaces according to claim 13, wherein the pressure-applying device comprising a chamber which covers the means for injecting the solid particles.

22. The transfer printing system for curved surfaces according to claim 13, further comprising suction-exhausting means at the position in front of the pressure-applying device.

23. The transfer printing system for curved surfaces according to claim 13, further comprising heating means for heating at least one of the base and the transfer printing sheet before they are carried to the position in front of the pressure-applying device.

* * * * *